United States Patent
Echigo

(10) Patent No.: US 10,162,165 B2
(45) Date of Patent: Dec. 25, 2018

(54) IMAGING DEVICE, IMAGE PROCESSING DEVICE, IMAGE PROCESSING METHOD, AND MICROSCOPE

(71) Applicant: OLYMPUS CORPORATION, Hachioji-shi, Tokyo (JP)

(72) Inventor: Hitoshi Echigo, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 84 days.

(21) Appl. No.: 15/373,386

(22) Filed: Dec. 8, 2016

(65) Prior Publication Data

US 2017/0090177 A1    Mar. 30, 2017

Related U.S. Application Data

(63) Continuation of application No. PCT/JP2015/064454, filed on May 20, 2015.

(30) Foreign Application Priority Data

Jun. 24, 2014    (JP) .................................. 2014-129065

(51) Int. Cl.
    G02B 21/36    (2006.01)
    G06T 3/60    (2006.01)
    (Continued)

(52) U.S. Cl.
    CPC ............ G02B 21/365 (2013.01); G01B 11/24 (2013.01); G02B 21/361 (2013.01);
    (Continued)

(58) Field of Classification Search
    None
    See application file for complete search history.

(56) References Cited

U.S. PATENT DOCUMENTS 6,642,497 B1    11/2003    Apostolopoulos et al.
8,103,112 B2    1/2012    Horie et al.
(Continued)

FOREIGN PATENT DOCUMENTS

JP    2005530410 A    10/2005
JP    2008219878 A    9/2008
(Continued)

OTHER PUBLICATIONS

International Search Report (ISR) dated Aug. 18, 2015 issued in International Application No. PCT/JP2015/064454.

*Primary Examiner* — Anand S Rao
*Assistant Examiner* — Tyler B Edwards
(74) *Attorney, Agent, or Firm* — Holtz, Holtz & Volek PC

(57) ABSTRACT

An imaging device includes: an imaging lens; an image sensor that includes a photodetector cell array in which a plurality of photodetector cells are disposed in an array; a lens array for generating disparity images that is provided between the imaging lens and the image sensor, and includes a plurality of lenses that are disposed in an array; and a processor including hardware, wherein the processor acquires rotation information that represents a relative direction of an image of an object formed by the imaging lens and the image sensor, and generates disparity images based on the acquired rotation information and image information obtained from the image sensor.

17 Claims, 22 Drawing Sheets

(51) Int. Cl.

| | | |
|---|---|---|
| *H04N 5/232* | (2006.01) | |
| *G06T 7/55* | (2017.01) | |
| *G01B 11/24* | (2006.01) | |
| *G03B 15/00* | (2006.01) | |
| *G03B 35/08* | (2006.01) | |
| *G06T 1/00* | (2006.01) | |
| *H04N 5/225* | (2006.01) | |
| *G06T 7/557* | (2017.01) | |
| *H04N 13/232* | (2018.01) | |

(52) U.S. Cl.
CPC .......... *G02B 21/362* (2013.01); *G03B 15/00* (2013.01); *G03B 35/08* (2013.01); *G06T 1/00* (2013.01); *G06T 1/0007* (2013.01); *G06T 3/60* (2013.01); *G06T 7/55* (2017.01); *G06T 7/557* (2017.01); *H04N 5/2254* (2013.01); *H04N 5/23296* (2013.01); *H04N 13/232* (2018.05); *G06T 2207/10052* (2013.01); *G06T 2207/10056* (2013.01); *G06T 2210/22* (2013.01)

(56) References Cited

U.S. PATENT DOCUMENTS

| | | |
|---|---|---|
| 2012/0050562 A1 | 3/2012 | Perwass et al. |
| 2013/0242052 A1* | 9/2013 | Hayashi ................ H04N 5/225 348/45 |

FOREIGN PATENT DOCUMENTS

| | | | |
|---|---|---|---|
| JP | 2009260805 A | | 11/2009 |
| JP | 2011228915 A | * | 11/2011 |
| JP | 2011228915 A | | 11/2011 |
| JP | 2012525028 A | | 10/2012 |
| JP | 2013197649 A | | 9/2013 |

* cited by examiner

NG

IMAGING DEVICE, IMAGE PROCESSING DEVICE, IMAGE PROCESSING METHOD, AND MICROSCOPE

CROSS REFERENCE TO RELATED APPLICATION

This application is a continuation of International Patent Application No. PCT/JP2015/064454, having an international filing date of May 20, 2015, which designated the United States, the entirety of which is incorporated herein by reference. Japanese Patent Application No. 2014-129065 filed on Jun. 24, 2014 is also incorporated herein by reference in its entirety.

BACKGROUND

The present invention relates to an imaging device, an image processing device, an image processing method, a microscope, and the like.

An imaging device that can acquire information about the incident angle of a light ray that enters an optical system (hereinafter referred to as "light field (LF) information") has been studied and developed in recent years. Such an imaging device is referred to as "plenoptic camera" or "light field (LF) camera", and can generate a plurality of images that differ in viewpoint (hereinafter referred to as "disparity images") from the LF information. Note that the term "viewpoint" used herein refers to a point from which the object is viewed (observed).

For example, image data that includes three-dimensional image information about the object can be generated from a plurality of disparity images generated from the LF information. The term "three-dimensional image information" used herein refers to information that includes information in the depth direction in addition to two-dimensional image information that is obtained using a conventional camera, for example. It is also possible to generate an image in which the object that is situated at an arbitrary imaging distance is brought into focus by processing the image data including the three-dimensional image information, and extracting the light rays that entered the optical system in an arbitrary direction to reconstruct a two-dimensional image.

For example, JP-A-2008-219878 discloses technology that performs an image generation process that corresponds to a focus value designated by the user using image data obtained by a plenoptic camera to generate a display image, and displays the generated display image.

The distance to the object in the depth direction (i.e., three-dimensional image information about the object) can be determined (measured) from a plurality of disparity images generated using a plenoptic camera by applying the principle of triangulation. In this case, triangulation is performed using a straight line that connects the viewpoints of two disparity images as a base line.

When the distance to an edge in the depth direction is determined (instead of the distance to a point in the depth direction) by applying triangulation, the measurement accuracy varies depending on the relationship between the direction of the base line and the direction of the edge. Specifically, it becomes more difficult to detect the disparity between the disparity images, and the distance measurement accuracy decreases, as the direction of the base line and the direction of the edge become parallel to each other. On the other hand, it becomes easier to detect the disparity between the disparity images, and the distance measurement accuracy increases, as the direction of the base line and the direction of the edge become orthogonal to each other.

Specifically, it is necessary to increase the angular resolution in the direction of the base line so as to be able to deal with an arbitrary edge (each edge), and generate a larger number of images viewed from different viewpoints in order to increase the distance measurement accuracy.

SUMMARY

According to one aspect of the invention, there is provided a n imaging device comprising:

an imaging lens;

an image sensor that includes a photodetector cell array in which a plurality of photodetector cells are disposed in an array;

a lens array for generating disparity images that is provided between the imaging lens and the image sensor, and includes a plurality of lenses that are disposed in an array; and a processor comprising hardware, wherein the processor acquires rotation information that represents a relative direction of an image of an object formed by the imaging lens and the image sensor, and generates disparity images based on the acquired rotation information and image information obtained from the image sensor.

According to another aspect of the invention, there is provided an image processing device comprising:

a processor comprising hardware, the processor being configured to implement:

an image information acquisition process that acquires image information obtained from an imaging section; and a process that generates disparity images based on the acquired the image information, wherein the imaging section includes:

an imaging lens;

an image sensor that includes a photodetector cell array in which a plurality of photodetector cells are disposed in an array; and a lens array for generating disparity images that is provided between the imaging lens and the image sensor, and includes a plurality of lenses that are disposed in an array, and the processor acquires rotation information that represents a relative direction of an image of an object formed by the imaging lens and the image sensor, and generates the disparity images based on the acquired rotation information and the image information obtained from the image sensor.

According to another aspect of the invention, there is provided an image processing method that generates disparity images based on image information obtained from an imaging section, wherein the imaging section includes:

an imaging lens;

an image sensor that includes a photodetector cell array in which a plurality of photodetector cells are disposed in an array; and a lens array for generating disparity images that is provided between the imaging lens and the image sensor, and includes a plurality of lenses that are disposed in an array, the image processing method comprising:

acquiring rotation information that represents a relative direction of an image of an object formed by the imaging lens and the image sensor; and generating the disparity images based on the acquired rotation information and the image information obtained from the image sensor.

According to another aspect of the invention, there is provided a microscope comprising:

an imaging lens;

an image sensor that includes a photodetector cell array in which a plurality of photodetector cells are disposed in an array;

a lens array for generating disparity images that is provided between the imaging lens and the image sensor, and includes a plurality of lenses that are disposed in an array; and a processor comprising hardware, wherein the processor acquires rotation information that represents a relative direction of an image of an object formed by the imaging lens and the image sensor, and generates disparity images based on the acquired rotation information and image information obtained from the image sensor.

DESCRIPTION OF EXEMPLARY EMBODIMENTS

Figure 1:
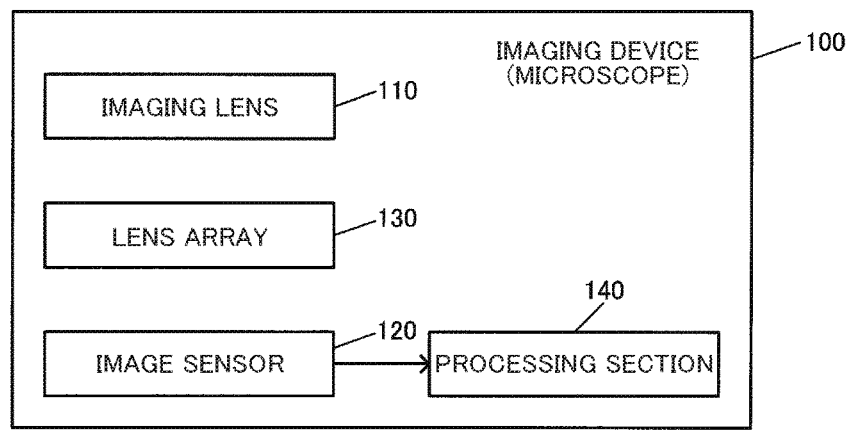
FIG. 1 illustrates a system configuration example according to the embodiments of the invention.

According to one embodiment of the invention, there is provided an imaging device comprising:

an imaging lens;

an image sensor that includes a photodetector cell array in which a plurality of photodetector cells are disposed in an array;

a lens array for generating disparity images that is provided between the imaging lens and the image sensor, and includes a plurality of lenses that are disposed in an array; and a processor comprising hardware, wherein the processor acquires rotation information that represents a relative direction of an image of an object formed by the imaging lens and the image sensor, and generates disparity images based on the acquired rotation information and image information obtained from the image sensor.

According to the imaging device, the image of the object by the imaging lens and the image sensor are rotated relative to each other, and the rotation information that represents the relative direction of the image of the object and the image sensor is acquired. The disparity images are generated based on the acquired rotation angle and the image information obtained from the image sensor. Therefore, it is possible to generate a larger number of disparity images while reducing or suppressing a decrease in the spatial resolution of each disparity image.

In the imaging device, wherein the processor may generate first disparity images based on first image information obtained from the image sensor before rotating the image of the object and the image sensor relative to each other, and may generate second disparity images based on second image information obtained from the image sensor after rotating the image of the object and the image sensor relative to each other, and the rotation information.

This makes it possible to generate disparity images in the same number as the number of disparity images that can be generated in a state in which the image of the object and the image sensor are not rotated relative to each other, each time the image of the object and the image sensor are rotated relative to each other, for example.

In the imaging device, wherein each of the plurality of lenses of the lens array may be provided corresponding to N photodetector cells among M photodetector cells of the image sensor (where N is an integer equal to or larger than 2, and M is an integer equal to or larger than N), and may refract incident light that has entered each of the plurality of lenses through the imaging lens corresponding to an incident angle with respect to each of the plurality of lenses so that the incident light enters one of the N photodetector cells.

This makes it possible to acquire the image information for forming pixels situated at the corresponding position within N disparity images from the N photodetector cells that are provided corresponding to each lens, for example.

In the imaging device, wherein the processor may acquire a rotation angle when a unit including the image sensor and the lens array, or the lens array, is rotated around an optical axis of the imaging lens relative to the imaging lens, as the rotation information, and may generate the disparity images based on the acquired rotation angle and the image information.

This makes it possible to adjust the direction of the image sensor with respect to the image of the object formed by the imaging lens.

The imaging device may further comprise: an image rotation element that is rotatable and is provided between the imaging lens and the lens array, wherein the processor may acquire a rotation angle of the image rotation element relative to the imaging lens as the rotation information, and may generate the disparity images based on the acquired rotation angle and the image information.

According to this configuration, since the image of the object can be rotated relative to the image sensor without moving the image sensor in which the number of lines (wires) is relatively large, it is possible to reduce the risk of failure (e.g., line (wire) breakage and contact failure), for example.

In the imaging device, wherein the processor may acquire the image information that corresponds to a first pixel coordinate system after rotating the image of the object and the image sensor relative to each other, and may perform a coordinate transformation process that transforms a pixel coordinate system of the image information from the first pixel coordinate system to a second pixel coordinate system based on the rotation information.

This makes it possible to acquire images in which the image of the object is captured in the same direction, for example.

In the imaging device, wherein the processor may perform an interpolation process based on the image information obtained by the coordinate transformation process to generate interpolated image information, and may generate the disparity images based on the interpolated image information.

This makes it possible to generate a disparity image as if the disparity image were captured in a state in which the position of each lens of the lens array is identical to the reference position of each lens, and the positions of a plurality of photodetector cells that correspond to the light-receiving area of each lens are identical to the reference position of each photodetector cell, for example.

In the imaging device, wherein the processor may acquire the image information that corresponds to a first pixel coordinate system after rotating the image of the object and the image sensor relative to each other, performs a coordinate transformation process that transforms a pixel coordinate system of the image information from the first pixel coordinate system to a second pixel coordinate system based on the rotation information, may perform an interpolation process based on the image information obtained by the coordinate transformation process to generate interpolated image information, and may generate the disparity images based on the interpolated image information.

This makes it possible to acquire a disparity image from which the disparity can be detected through comparison with a disparity image used as a reference, for example.

In the imaging device, wherein the processor may generate a display image by performing an interpolation process based on first image information obtained from the image sensor before rotating the image of the object and the image sensor relative to each other, and second image information obtained from the image sensor after rotating the image of the object and the image sensor relative to each other.

This makes it possible to increase the spatial resolution of the display image that does not have the LF information, for example.

The imaging device may further comprise: a memory that stores the rotation information and the image information in a linked manner.

This makes it possible to generate a disparity image from which the disparity can be detected by comparing the rotation information linked to the image information with the disparity image generated before rotation based on the image information, for example.

The imaging device may further comprise: a rotation device that rotates the image sensor and the image of the object relative to each other.

This makes it possible to generate the disparity images when the object is viewed from a viewpoint that differs the viewpoint before rotation, for example.

In the imaging device, wherein the rotation device may rotate the image of the object and the image sensor relative to each other based on at least two pieces of information among an imaging count i (where i is an integer equal to or larger than 2) of the object, a step angle that is a relative rotation angle of the image of the object and the image sensor until a (j+1)th (where j is an integer equal to or larger than 1) imaging operation is performed after a jth imaging operation has been performed, and a relative rotation angle range of the image of the object and the image sensor while an imaging operation is performed i times.

This makes it possible to easily rotate the image of the object and the image sensor relative to each other in a flexible way corresponding to the imaging conditions without requiring the user to manually rotate the image sensor and the like each time the imaging operation is performed, or programming the direction of the image sensor in advance, for example.

The imaging device may further comprise: an image rotation element that is rotatable and is provided between the imaging lens and the lens array, wherein the rotation device may rotate the image rotation element relative to the imaging lens around an optical axis of the imaging lens.

This makes it unnecessary for the user to manually rotate the image rotation element, for example.

In the imaging device, wherein the rotation device may rotate the image of the object and the image sensor relative to each other based on a direction of an edge of the image of the object.

This makes it possible to acquire necessary and sufficient cell information by adjusting the image of the object and the image sensor only in the necessary direction, and prevent an increase in the amount of calculations and the processing time, for example.

In the imaging device, wherein the processor may perform a trimming process that trims away an edge area of the generated disparity images.

This makes it possible to reduce an area having low spatial resolution within the disparity images, for example.

According to another embodiment of the invention, there is provided an image processing device comprising:

a processor comprising hardware, the processor being configured to implement:

an image information acquisition process that acquires image information obtained from an imaging section; and a process that generates disparity images based on the acquired the image information, wherein the imaging section includes:

an imaging lens;

an image sensor that includes a photodetector cell array in which a plurality of photodetector cells are disposed in an array; and a lens array for generating disparity images that is provided between the imaging lens and the image sensor, and includes a plurality of lenses that are disposed in an array, and the processor acquires rotation information that represents a relative direction of an image of an object formed by the imaging lens and the image sensor, and generates the disparity images based on the acquired rotation information and the image information obtained from the image sensor.

According to another embodiment of the invention, there is provided an image processing method that generates disparity images based on image information obtained from an imaging section, wherein the imaging section includes:

an imaging lens;

an image sensor that includes a photodetector cell array in which a plurality of photodetector cells are disposed in an array; and a lens array for generating disparity images that is provided between the imaging lens and the image sensor, and includes a plurality of lenses that are disposed in an array, the image processing method comprising:

acquiring rotation information that represents a relative direction of an image of an object formed by the imaging lens and the image sensor; and generating the disparity images based on the acquired rotation information and the image information obtained from the image sensor.

According to another embodiment of the invention, there is provided a microscope comprising:

an imaging lens;

an image sensor that includes a photodetector cell array in which a plurality of photodetector cells are disposed in an array;

a lens array for generating disparity images that is provided between the imaging lens and the image sensor, and includes a plurality of lenses that are disposed in an array; and a processor comprising hardware, wherein the processor acquires rotation information that represents a relative direction of an image of an object formed by the imaging lens and the image sensor, and generates disparity images based on the acquired rotation information and image information obtained from the image sensor.

Therefore, it is possible to rotate the direction of the base line, and improve the distance measurement accuracy even when it is impossible to acquire an edge that is orthogonal to the direction of the base line, or the amount of edge that can be acquired is small.

The exemplary embodiments of the invention are described below. Note that the exemplary embodiments described below do not in any way limit the scope of the invention laid out in the claims. Note also that all of the elements described below in connection with the exemplary embodiments should not necessarily be taken as essential elements of the invention.

1. Outline

FIG. 1 illustrates a system configuration example of an imaging device (plenoptic camera) according to the embodiments of the invention. An imaging device 100 according to the embodiments of the invention includes an imaging lens 110, an image sensor 120, a lens array 130 for generating disparity images, and a processing section 140. Examples of the imaging device 100 include a microscope and the like. Note that the configuration of the imaging device 100 is not limited to the configuration illustrated in FIG. 1. Various modifications may be made, such as omitting some of the elements illustrated in FIG. 1, or providing an additional element. Note that some or all of the functions of the imaging device 100 according to the embodiments of the invention may be implemented by a personal computer (PC) or a portable electronic device, for example. Some or all of the functions of the imaging device 100 according to the embodiments of the invention may be implemented by a server that is connected to the imaging device 100 via a communication channel through a network that includes at least one of a cable network and a wireless network.

The image sensor 120 included in the imaging device 100 includes a photodetector cell array in which a plurality of (M) photodetector cells are disposed in an array (see FIGS. 2 and 3A (described later)). The term "photodetector cell" used herein refers to a minimum unit of a photodetector that is included in an image sensor. The photodetector cell acquires a signal that corresponds to the intensity of a light ray that has been received by the photodetector cell. Note that M is an integer equal to or larger than 2.

The lens array 130 is provided between the imaging lens 110 and the image sensor 120, and includes a plurality of lenses that are disposed in an array (see FIG. 2 (described later)).

The processing section 140 generates disparity images based on image information obtained from the image sensor 120. Note that the function of the processing section 140 may be implemented by hardware such as a processor (e.g., CPU) or an ASIC (e.g., gate array), a program, or the like.

Figure 3:
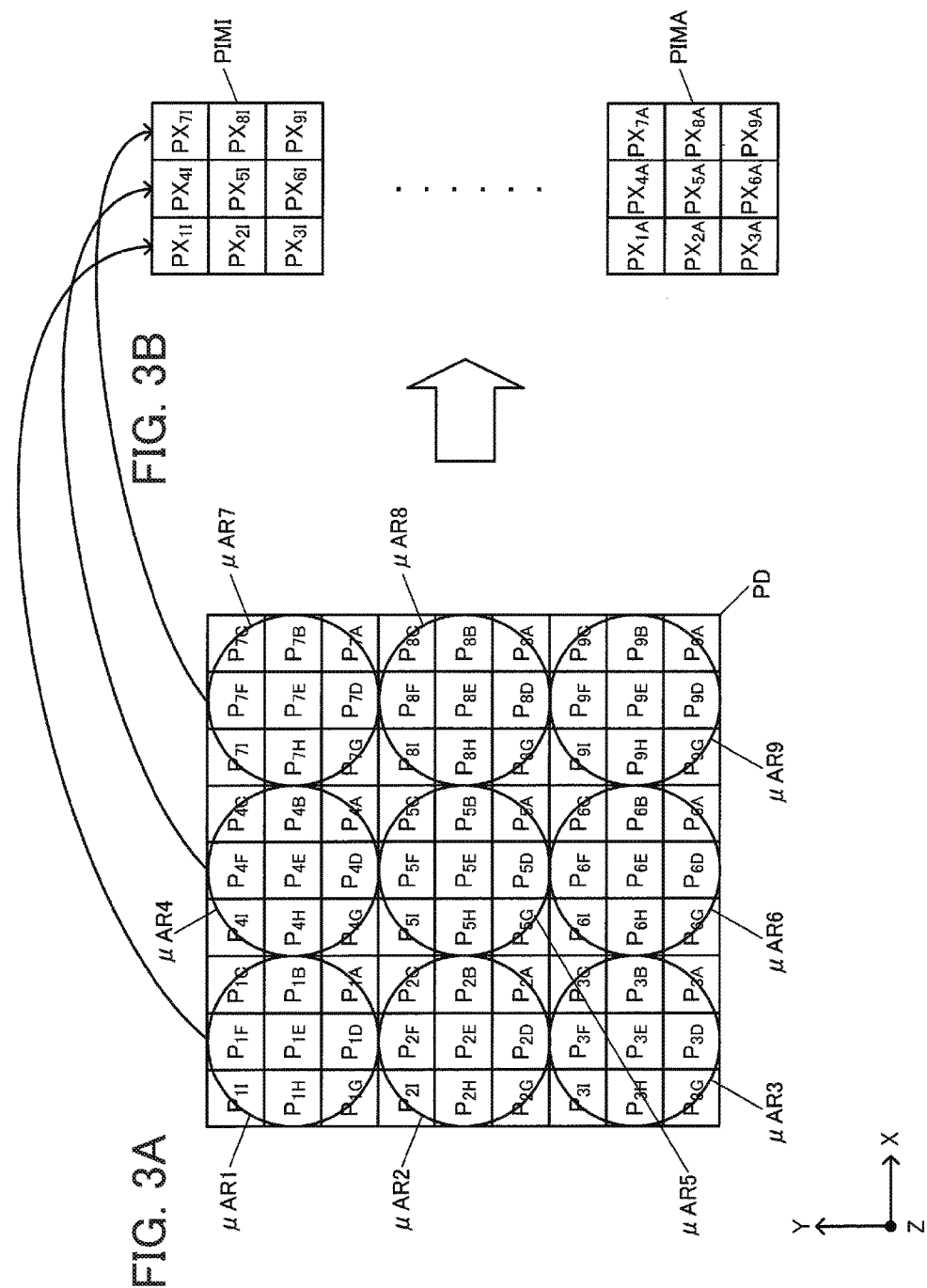
FIGS. 3A and 3B are views illustrating an image sensor and disparity images.
Figure 4:
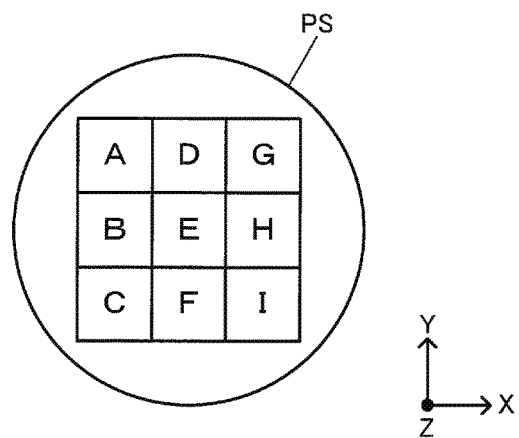
FIG. 4 is a view illustrating a light ray passage area of an imaging lens pupil plane.

A specific example is described below with reference to FIGS. 2 to 4. FIG. 2 is a side view (YZ plane view) illustrating the optical system (imaging lens, lens array, and image sensor) of the imaging device 100 according to the embodiments of the invention. In FIG. 2, the X-axis is an axis that extends in the width direction (i.e., the direction perpendicular to the sheet) of the optical system, the Y-axis is an axis that extends in the height direction of the optical system, and the Z-axis is an axis that extends in the thickness direction of the optical system. The X-axis, the Y-axis, and the Z-axis are orthogonal to each other. The orthogonal coordinate system illustrated in FIGS. 3A to 5 is the same as the orthogonal coordinate system that is defined by the X-axis, the Y-axis, and the Z-axis illustrated in FIG. 2.

Figure 2:
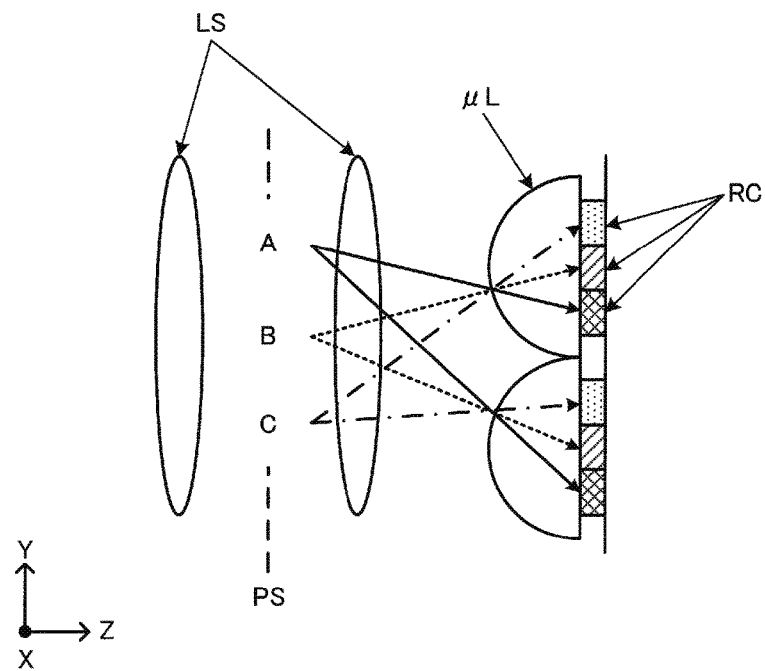
FIG. 2 illustrates a configuration example of an optical system according to the embodiments of the invention.

As illustrated in FIG. 2, the imaging device according to the embodiments of the invention includes an imaging lens LS, an image sensor that includes a plurality of photodetector cells RC, and a microlens array in which small lenses µL (hereinafter referred to as "microlenses µL") are disposed in an array. Each microlens µL is disposed to be situated close to some of the plurality of photodetector cells.

FIG. 3A illustrates a detailed example of the image sensor and the microlens array illustrated in FIG. 2. FIG. 3A illustrates an XY plane view when a microlens array that includes nine microlenses is disposed corresponding to an image sensor PD that includes eighty-one photodetector cells. In the example illustrated in FIG. 3A, the microlens array is disposed so that each microlens corresponds to nine photodetector cells among the eighty-one photodetector cells. More specifically, a microlens having a light-receiving area μAR1 is provided corresponding to photodetector cells $P_{1A}$ to $P_{1I}$, and a microlens having a light-receiving area μAR2 is provided corresponding to photodetector cells $P_{2A}$ to $P_{2I}$. The remaining photodetector cells and the remaining microlenses have the same relationship as described above. Note that the number of photodetector cells included in the image sensor PD is not limited to 81, and the number of lenses included in the microlens array is not limited to 9. The number of photodetector cells and the number of microlenses are set for convenience of illustration in the example illustrated in FIG. 3A, and a larger number of photodetector cells and a larger number of microlenses are normally provided in the actual application. The size of the photodetector cells and the size of the microlenses are as small as several micrometers, and a gap is normally formed between the photodetector cells and between the microlenses. However, since such a gap can be ignored with regard to the description of the embodiments of the invention, such a gap is not illustrated in the example illustrated in FIG. 3A, and is not taken into consideration.

The imaging device according to the embodiments of the invention differs from a camera that utilizes a known imaging method that does not acquire the LF information in that the imaging device according to the embodiments of the invention includes the microlens array. A camera that does not acquire the LF information is configured so that light rays that have passed through the imaging lens are focused on one point. On the other hand, the imaging device according to the embodiments of the invention is configured so that light rays that have passed through the imaging lens LS are separated by the microlenses μL, and received by different photodetector cells RC (see FIG. 2).

Light rays that enter the optical system of the imaging device 100 are refracted as described in detail below. Light rays that have passed through an identical light ray passage area (e.g., A in FIG. 2) in an imaging lens pupil plane PS are refracted by the imaging lens LS corresponding to the incident angle with respect to the imaging lens pupil plane PS, and enter one of the microlenses μL of the microlens array. The light rays that have entered each microlens μL of the microlens array are further refracted by each microlens L corresponding to the incident angle with respect to each microlens μL, and enter one of the plurality of photodetector cells RC that corresponds to the light-receiving area of each microlens μL.

FIG. 4 illustrates an XY plane view of the imaging lens pupil plane PS of the imaging lens LS used in the example illustrated in FIGS. 2 and 3A. For example, light rays that have passed through the upper left light ray passage area A of the imaging lens pupil plane PS illustrated in FIG. 4 are refracted by each microlens μL of the microlens array, and enter the lower right photodetector cells ($P_{1A}$, $P_{2A}$, $P_{3A}$, $P_{4A}$, $P_{5A}$, $P_{6A}$, $P_{7A}$, $P_{8A}$, $P_{9A}$) within the respective light-receiving areas (μAR1 to μAR9) illustrated in FIG. 3A. Likewise, light rays that have passed through the lower center light ray passage area F of the imaging lens pupil plane PS illustrated in FIG. 4 enter the upper center photodetector cells ($P_{1F}$, $P_{2F}$, $P_{3F}$, $P_{4F}$, $P_{5F}$, $P_{6F}$, $P_{7F}$, $P_{8F}$, $P_{9F}$) within the respective light-receiving areas (μAR1 to μAR9) illustrated in FIG. 3A. The above also applies to the other light ray passage areas (B to E and G to I). Specifically, light rays that have entered the imaging lens LS enter the photodetector cells that are situated within the light-receiving areas (μAR1 to tμAR9) of the respective microlenses at a position that is point-symmetrical with respect to the position (light ray passage area) at which the light rays passed through the imaging lens pupil plane PS.

As described above, each lens of the lens array 130 is provided corresponding to N photodetector cells among M photodetector cells of the image sensor 120 (where N is an integer equal to or larger than 2, and M is an integer equal to or larger than N), and refracts incident light that has entered each lens through the imaging lens 110 corresponding to the incident angle with respect to each lens so that the incident light enters one of the N photodetector cells. In the example illustrated in FIG. 3A, M=81, and N=9.

This makes it possible to acquire the image information for forming pixels situated at the corresponding position (at the same pixel coordinates) within N disparity images from the N photodetector cells (e.g., $P_{1A}$, $P_{1B}$, $P_{1C}$, $P_{1D}$, $P_{1E}$, $P_{1F}$, $P_{1G}$, $P_{1H}$, and $P_{1I}$ illustrated in FIG. 3A) that are provided corresponding to each lens, for example. Note that the pixels situated at the corresponding position within N disparity images refer to a pixel $PX_{1I}$ of a disparity image PIMI and a pixel $PX_{1A}$ of a disparity image PIMA illustrated in FIG. 3B (described later), for example. Specifically, light rays that have entered an identical microlens have the image information (light ray information) through an identical point of the object plane of the imaging lens.

A plurality of pieces of image information acquired from different photodetector cells within an identical light-receiving area differ as to the viewpoint with respect to the object. As simply illustrated in FIG. 2, light rays that have passed through different light ray passage areas of the imaging lens pupil plane enter different photodetector cells among a plurality of photodetector cells provided corresponding to one light-receiving area. For example, the viewpoint of the image information acquired from the photodetector cell $P_{1I}$ is the light ray passage area I of the imaging lens pupil plane PS illustrated in FIG. 4, and the viewpoint of the image information acquired from the photodetector cell $P_{1F}$ is the light ray passage area F of the imaging lens pupil plane PS.

Therefore, it is possible to acquire the image information when the object is viewed from an identical light ray passage area of the imaging lens pupil plane from the photodetector cells (e.g., $P_{1A}$, $P_{2A}$, $P_{3A}$, $P_{4A}$, $P_{5A}$, $P_{6A}$, $P_{7A}$, $P_{8A}$, and $P_{9A}$ illustrated in FIG. 3A) that are provided corresponding to the respective lenses and situated at the corresponding position, for example.

Therefore, a disparity image viewed from one of the light ray passage areas of the imaging lens pupil plane is obtained by generating an image in which each pixel is formed based on the image information acquired from each photodetector cell that is provided corresponding to each light-receiving area and is situated at the corresponding position. Note that the term "pixel" used herein refers to a minimum unit that forms an image. Each pixel is calculated based on a signal obtained from each photodetector cell, and has brightness information.

For example, the disparity image PIMI illustrated in FIG. 3B can be generated by generating an image based on the image information acquired from the upper left photodetector cells ($P_{1I}$, $P_{2I}$, $P_{3I}$, $P_{4I}$, $P_{5I}$, $P_{6I}$, $P_{7I}$, $P_{8I}$, and $P_{9I}$) provided corresponding to the respective light-receiving areas (see FIG. 3A). The disparity image PIMI is an image of which the viewpoint is the light ray passage area I of the imaging lens pupil plane PS illustrated in FIG. 4. The disparity images PIMA to PIMH are generated in the same manner as described above to obtain nine disparity images in total. Note that the pixel $PX_{mn}$ (where m is an integer that satisfies $1 \leq m \leq 9$, and n is an integer of $1 \leq n \leq 9$) illustrated in FIG. 3B has a pixel value that is calculated based on the image information acquired from the photodetector cell $P_{mn}$ within the light-receiving area µARm illustrated in FIG. 3A.

The distance to the object in the depth direction (i.e., three-dimensional image information about the object) can be determined from a plurality of disparity images generated using a plenoptic camera by applying the principle of triangulation (see above). In this case, triangulation is performed using a straight line that connects the viewpoints of two disparity images as a base line.

Figure 5:
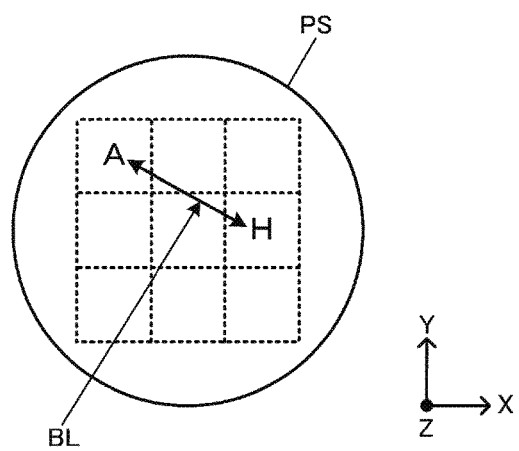
FIG. 5 is a view illustrating the direction of a base line (base line direction).

For example, when triangulation is performed based on a disparity image of which the viewpoint is the light ray passage area A of the imaging lens pupil plane PS (i.e., disparity image PIMA (see FIG. 3B)), and a disparity image of which the viewpoint is the light ray passage area H of the imaging lens pupil plane PS (i.e., disparity image PIMH (see FIG. 3B)), a line segment BL that connects the light ray passage area A and the light ray passage area H is used as the base line (see FIG. 5).

When the distance to an edge in the depth direction is determined (instead of the distance to a point in the depth direction) by applying triangulation, the measurement accuracy varies depending on the relationship between the direction of the base line and the direction of the edge. Specifically, it becomes more difficult to detect the disparity between the disparity images, and the distance measurement accuracy decreases, the direction of the base line and the direction of the edge become parallel to each other. On the other hand, it becomes easier to detect the disparity between the disparity images, and the distance measurement accuracy increases, as the direction of the base line and the direction of the edge become orthogonal to each other.

Figure 6:
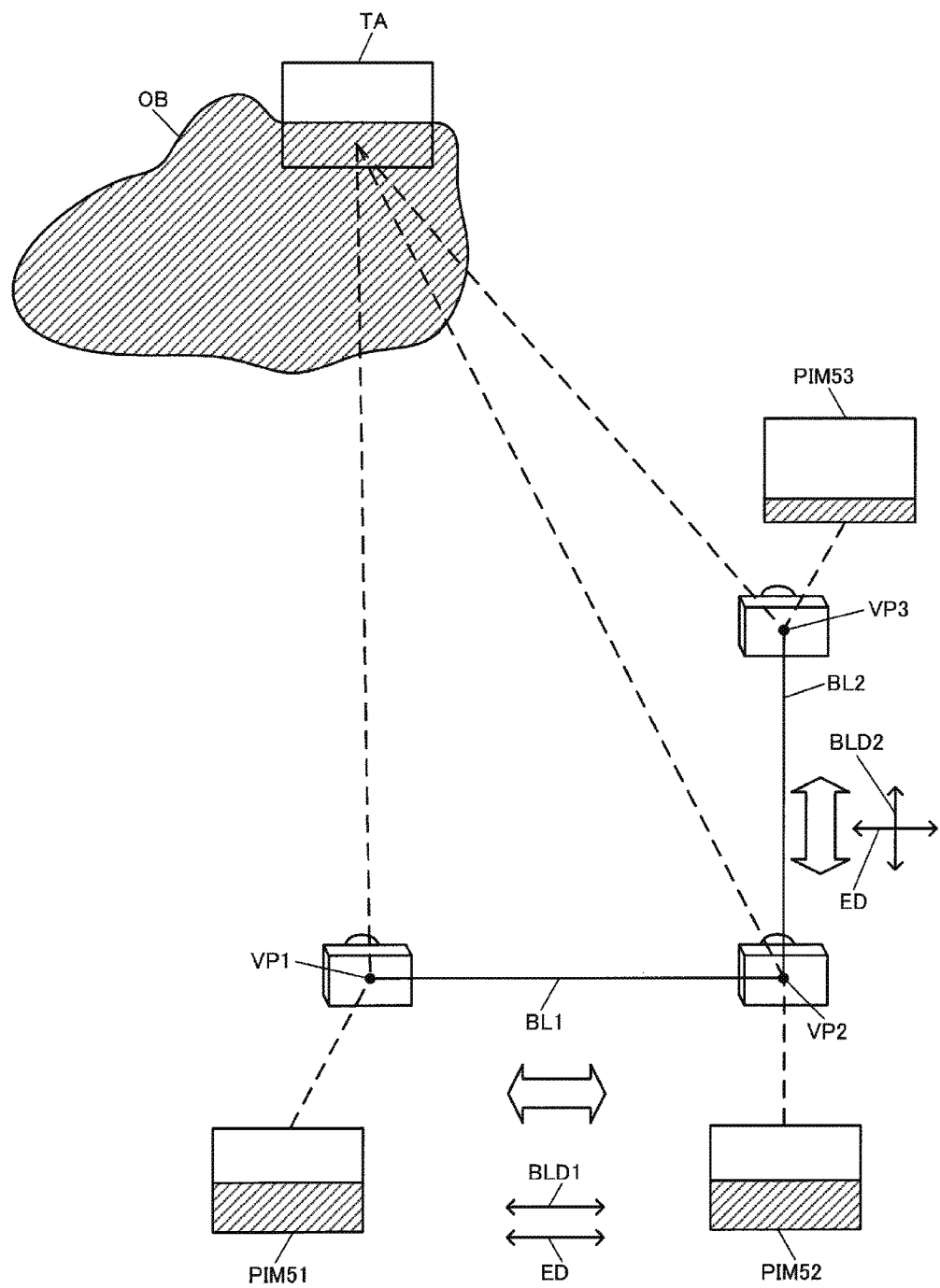
FIG. 6 is a view illustrating the relationship between the direction of a base line and the direction of the edge of an object.

FIG. 6 illustrates an example in which an imaging range TA including part of an object OB is captured from three different viewpoints (VP1 to VP3). A first image PIM51 is obtained by capturing the imaging range TA from the first viewpoint VP1, a second image PIM52 is obtained by capturing the imaging range TA from the second viewpoint VP2, and a third image PIM53 is obtained by capturing the imaging range TA from the third viewpoint VP3. Note that the direction of the edge of the object OB detected from the first image PIM51, the second image PIM52, and the third image PIM53 is the direction indicated by ED.

When triangulation is performed based on the first image PIM51 and the second image PIM52, a line segment BL1 that connects the first viewpoint VP1 and the second viewpoint VP2 is used as the base line. The direction of the base line (BL1) is the direction indicated by BLD1, and is parallel to the direction (ED) of the edge of the object OB. Therefore, only a small difference is observed between the first image PIM51 and the second image PIM52, and it is difficult to determine whether the first image PIM51 and the second image PIM52 are an image captured from the first viewpoint VP or an image captured from the second viewpoint VP2. Accordingly, it is difficult to accurately estimate the distance to the object OB from the first image PIM51 and the second image PIM52.

When triangulation is performed based on the second image PIM52 and the third image PIM53, a line segment BL2 that connects the second viewpoint VP2 and the third viewpoint VP3 is used as the base line. The direction of the base line (BL2) is the direction indicated by BLD2, and is orthogonal to the direction (ED) of the edge of the object OB. In this case, since the edge of the object OB observed within the third image PIM53 is lower than the edge of the object OB observed within the second image PIM52, it is possible to easily determine that the third image PIM53 is an image captured from the third viewpoint VP3. Therefore, it is easy to accurately estimate the distance to the object OB from the second image PIM52 and the third image PIM53.

Specifically, it is necessary to increase the angular resolution in the direction of the base line so as to be able to deal with an arbitrary edge (each edge) in order to increase the distance measurement accuracy by means of triangulation. It is necessary to generate a larger number of disparity images viewed from different viewpoints in order to increase the angular resolution in the direction of the base line.

It is necessary to increase the number of photodetector cells included in the light-receiving area of each microlens by one in order to increase the number of disparity images (to be generated) by one. However, since the number of photodetector cells included in the image sensor is limited, the number of pixels included in each disparity image decreases by the number of microlenses when the number of photodetector cells included in the light-receiving area of each microlens is increased by one. For example, an 81-pixel image can be generated by generating one image using the image sensor PD illustrated in FIG. 3A. However, only 9-pixel disparity images having a spatial resolution that is ⅓rd of that of the 81-pixel image can be generated when nine disparity images are generated using the image sensor PD (see FIG. 3B). Specifically, the number of disparity images and the spatial resolution of each disparity image have a trade-off relationship (i.e., the spatial resolution of each disparity image decreases as the number of disparity images is increased). The spatial resolution of the display image obtained by the focus position adjustment process (see above) decreases due to a decrease in the spatial resolution of each disparity image.

The imaging device 100 and the like according to the embodiments of the invention can generate a larger number of disparity images while reducing or suppressing a decrease in the spatial resolution of each disparity image.

For example, the rotation device 160 illustrated in FIG. 7 (described later) rotates the image of the object formed by the imaging lens 110 and the image sensor 120 relative to each other.

The processing section 140 acquires rotation information that represents the relative direction of the image of the object formed by the imaging lens 110 and the image sensor 120, and generates disparity images based on the acquired rotation information and the image information obtained from the image sensor 120.

Figure 24:
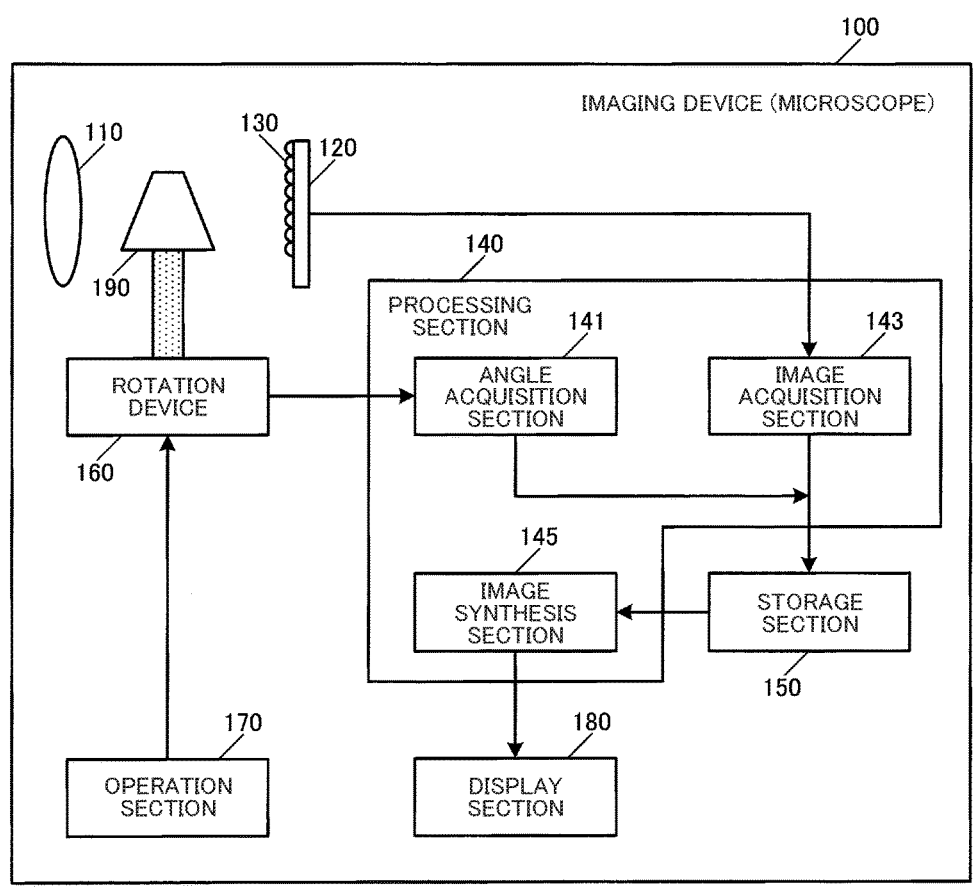
FIG. 24 illustrates a system configuration example (second embodiment).

The image of the object and the image sensor 120 may be rotated relative to each other using a method that rotates a unit including the image sensor 120 and the lens array 130, or the lens array 130, relative to the imaging lens 110 (see the first embodiment described later), for example. The image of the object and the image sensor 120 may also be rotated relative to each other using a method that that provides an image rotation element 190 (see FIG. 24 (described later)) between the imaging lens 110 and the image sensor 120, and rotates the image of the object relative to the image sensor 120 by rotating the image rotation element 190. Note that the image of the object and the image sensor 120 may be rotated relative to each other using an arbitrary method other than the methods described above. A specific method that generates the disparity images based on the rotation information and the image information is described later.

The processing section 140 generates first disparity images based on first image information obtained from the image sensor 120 before rotating the image of the object and the image sensor 120 relative to each other, and generates second disparity images based on second image information obtained from the image sensor 120 after rotating the image of the object and the image sensor 120 relative to each other, and the rotation information.

Specifically, it is possible to generate disparity images in the same number as the number of disparity images that can be generated in a state in which the image of the object and the image sensor 120 are not rotated relative to each other, each time the image of the object and the image sensor 120 are rotated relative to each other, for example. For example, when nine disparity images can be generated at a time (see FIG. 3A), eighteen disparity images can be generated in total by one rotation, and twenty-seven disparity images can be generated in total by two rotations. According to the embodiments of the invention, since the number of photodetector cells that are provided corresponding to the light-receiving area of each lens of the lens array 130 is not changed, a decrease in the spatial resolution of each disparity image does not occur even when the number of disparity images (to be generated) is increased.

Therefore, it is possible to generate a larger number of disparity images while reducing or suppressing a decrease in the spatial resolution of each disparity image.

2. First Embodiment

The first embodiment illustrates an example in which a unit including the image sensor 120 and the lens array 130, or the lens array 130, is rotated relative to the imaging lens 110 to rotate the image of the object and the image sensor 120 relative to each other. Specifically, the image sensor 120 is rotated without rotating the image of the object.

2.1. System Configuration Example

Figure 7:
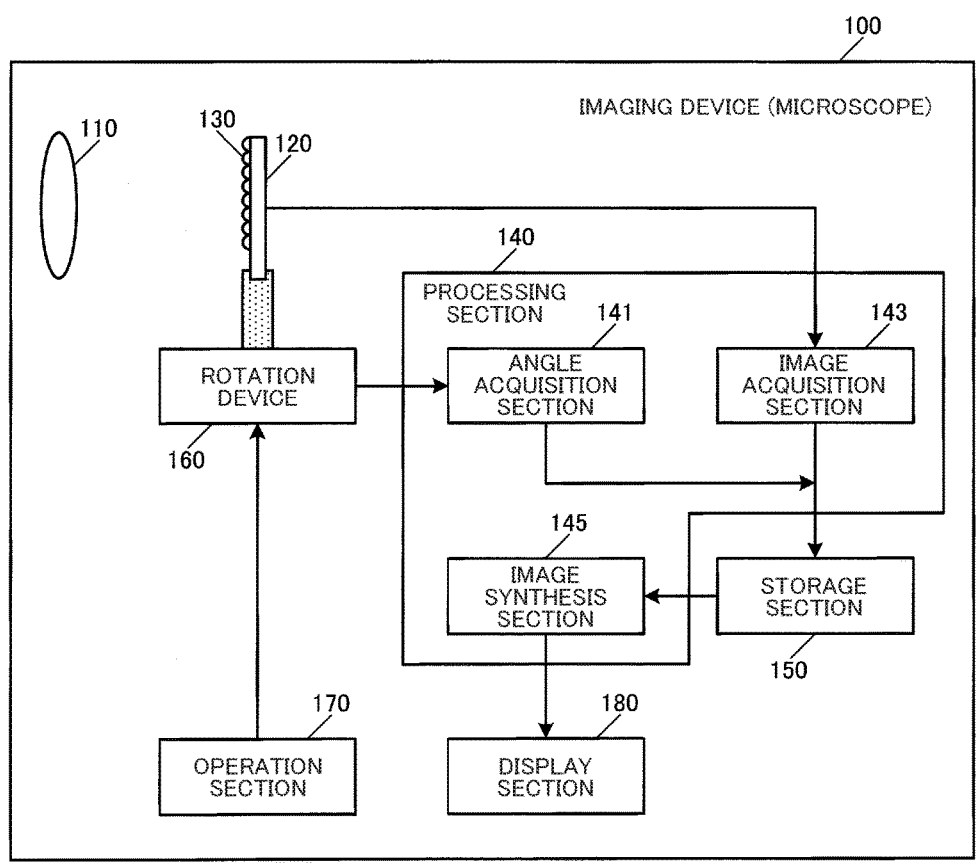
FIG. 7 illustrates a system configuration example (first embodiment).

FIG. 7 illustrates a detailed system configuration example of an imaging device according to the first embodiment. Note that description of the same elements and the like as those described above with reference to FIG. 1 is appropriately omitted.

An imaging device 100 according to the first embodiment includes an imaging lens 110, an image sensor 120, a lens array 130, a processing section 140, a storage section 150, a rotation device 160 (an adjustment section, an adjustment device), an operation section 170, and a display section 180. Specific examples of the imaging device 100 according to the first embodiment include an imaging device that includes a PC main body, and a camera (e.g., microscope) that is provided separately from the PC main body. In such a case, the camera includes the imaging lens 110, the image sensor 120, the lens array 130, and the rotation device 160, and the PC main body includes the processing section 140, the storage section 150, the operation section 170, and the display section 180. Note that the operation section 170 and the display section 180 may be provided separately from the PC main body and the camera.

The details of each section are described below. The image sensor 120 is implemented by a CCD image sensor, a CMOS image sensor, or the like. The image sensor 120 can be rotated (driven) in the rotation direction around the optical axis of the imaging lens 110.

The lens array 130 is provided near the image sensor 120 (see above), and rotated (driven) in the rotation direction around the optical axis of the imaging lens 110 in synchronization with (simultaneously with) the image sensor 120. The image sensor 120 and the lens array 130 may be integrally formed to form a single unit, and rotated (driven) integrally. Note that the image sensor 120 and the lens array 130 need not necessarily be rotated in synchronization with each other (simultaneously). A configuration in which only the lens array 130 is rotated may also be employed.

Each lens included in the lens array 130 is a circular microlens, for example. Note that the shape of each lens is not limited to a circle. For example, each lens may have a quadrangular shape or a hexagonal shape so that no gap is formed between adjacent lenses. Each lens included in the lens array 130 may be a lens having a different curvature depending on the axial direction (e.g., cylindrical lens (described later)).

The processing section 140 includes an angle acquisition section 141, an image acquisition section 143, and an image synthesis section 145.

The angle acquisition section 141 acquires rotation information that represents the relative direction of the image of the object formed by the imaging lens 110, and the image sensor 120. More specifically, the angle acquisition section 141 is implemented by a rotary encoder, an angle sensor, or the like, and acquires the rotation angle with respect to a reference angle of at least one of the image sensor 120 and the lens array 130. The details of the reference angle are described later.

The image acquisition section 143 is implemented by an image sensor driver or the like, and acquires image information from each photodetector cell included in the image sensor 120. The image information is information about the pixel value calculated from the signal of the light ray received by the photodetector cell, for example. The image acquisition section 143 may acquire the pixel coordinate values of the image information in addition to the image information, for example. A set of the image information and the pixel coordinate values of the image information is hereinafter referred to as "cell information". The image acquisition section 143 may be formed integrally with the image sensor.

The image synthesis section 145 generates the disparity images based on the image information. The image synthesis section 145 is implemented by software installed on a PC, for example.

The storage section 150 stores the disparity images that have been generated by the image synthesis section 145, a display image that is displayed on the display section 180, and a database, and serves as a work area for the processing section 140 and the like. The function of the storage section 150 may be implemented by a memory (e.g., random access memory (RAM)), a hard disk drive (HDD), or the like. The storage section 150 may be provided to a PC, or may be provided separately, and connected to the processing section 140 and the like through a communication channel.

The rotation device 160 is implemented by a motor and a motor driver that rotate the unit including the image sensor 120 and the lens array 130, or the lens array 130. When the unit including the image sensor 120 and the lens array 130, or the lens array 130, is rotated manually by the user, the rotation device 160 is implemented by a drive mechanism that rotates the unit including the image sensor 120 and the lens array 130, or the lens array 130.

The operation section 170 is implemented by a mouse, a keyboard, a button, a switch, and the like that receive the operation performed by the user for driving the rotation device 160. The operation section 170 may include operation software and a memory.

The display section 180 displays the disparity image or the display image generated based on the disparity image. The display section 180 may be implemented by a liquid crystal display, an organic EL display, an electronic paper, or the like.

According to the first embodiment, it is possible to generate the disparity images when the object is viewed from a viewpoint that differs from the viewpoint before rotation by providing the rotation device 160 that rotates the image sensor 120 and the image of the object relative to each other, for example.

2.2. Details of Process

In the first embodiment, the processing section 140 acquires the rotation angle when the unit including the image sensor 120 and the lens array 130, or the lens array 130, is rotated around the optical axis (i.e., rotation axis) of the imaging lens 110 relative to the imaging lens 110, as the rotation information, and generates the disparity images based on the acquired rotation angle and the image information.

This makes it possible to adjust the direction of the image sensor 120 with respect to the image of the object formed by the imaging lens 110.

The flow of the process according to the first embodiment is described below with reference to the flowcharts illustrated in FIGS. 8 and 10.

Figure 8:
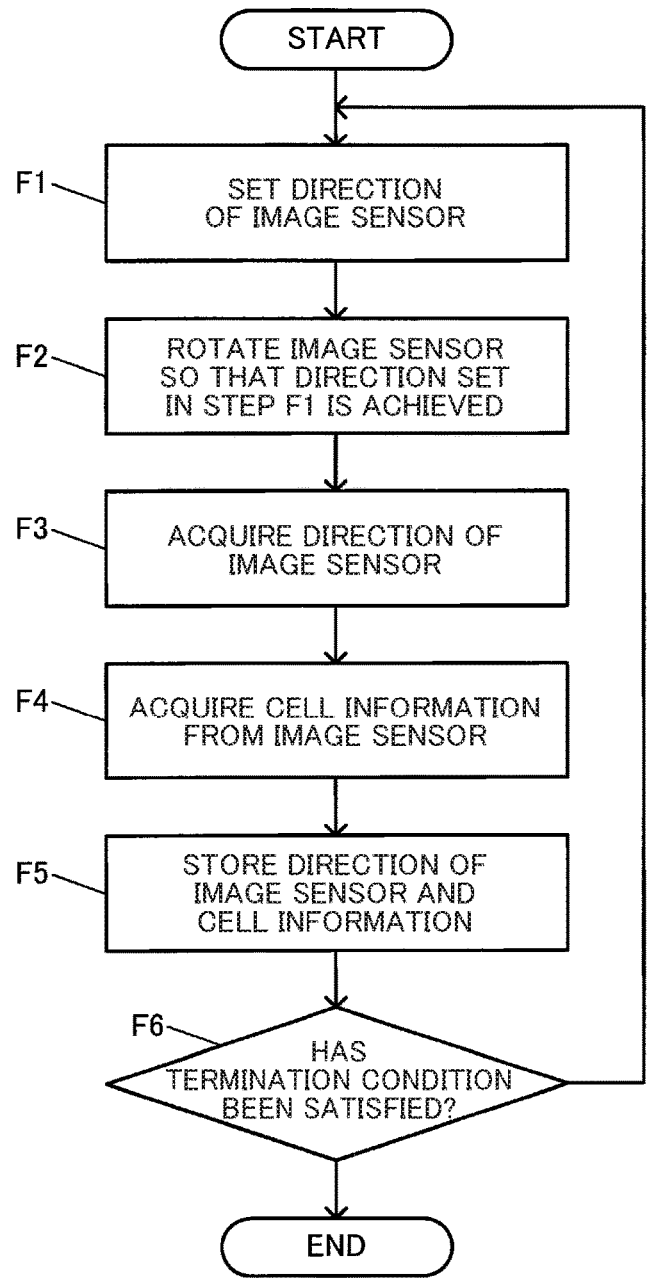
FIG. 8 is a flowchart illustrating the flow of a process (first embodiment).

As illustrated in FIG. 8, the direction of the image sensor 120 with respect to the image of the object is set (F1). The direction of the image sensor 120 refers to the target direction when the image sensor 120 and the lens array 130 are rotated (driven).

Figure 9:
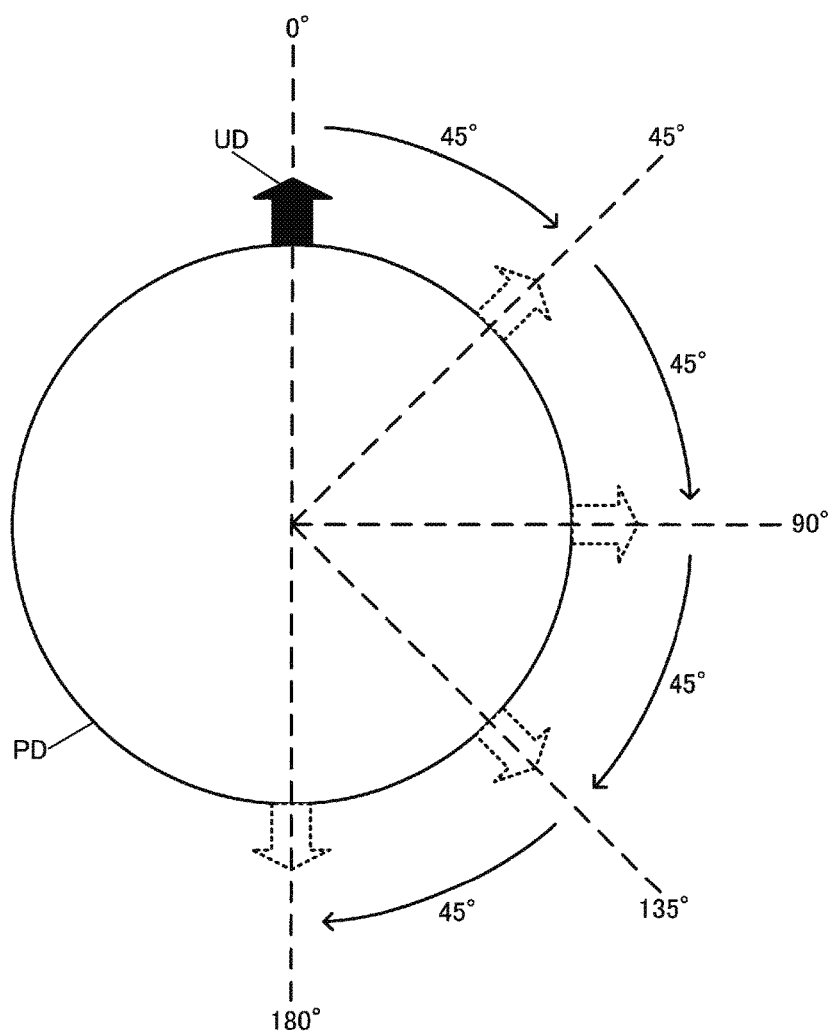
FIG. 9 is a view illustrating a step angle and a rotation angle range.

For example, when the upward direction UD of the image sensor PD before rotation is used as the reference direction, the angle (reference angle) of the reference direction is set to 0°, and the image sensor 120 is rotated clockwise by 45°, the target direction of the image sensor 120 to be achieved by the first rotation is the direction at 45° (see FIG. 9). The target direction of the image sensor 120 to be achieved by the second rotation is the direction at 90°.

The user can designate an arbitrary method among a plurality of methods for driving the image sensor 120 and the lens array 130. The operation section 170 calculates the target direction of the image sensor 120 using the method designated by the user.

For example, the image sensor 120 and the lens array 130 may be driven using a method that allows the user to designate the direction of the image sensor 120 each time the image sensor 120 and the lens array 130 are driven, or directly adjust the direction of the image sensor 120, a method that utilizes the direction of the image sensor 120 that is programmed in advance, a method that designates the rotation angle range and the imaging count, a method that designates the rotation angle range and the step angle, a method that designates the step angle and the imaging count, or the like.

Note that the term "step angle" used herein refers to an angle by which the image sensor 120 is rotated relative to the image of the object when the direction of the image sensor 120 is adjusted. In the example illustrated in FIG. 9, the step angle is 450°.

In the first embodiment, the imaging operation is performed each time the direction of the image sensor 120 is adjusted. Therefore, the step angle may be considered to be the relative rotation angle of the image of the object and the image sensor 120 until a (j+1)th (where j is an integer equal to or larger than 1) imaging operation is performed after a jth imaging operation has been performed. The step angle is normally fixed. Note that the step angle may be exceptionally changed during rotation (as described later).

The term "rotation angle range" used herein refers to the relative rotation angle of the image of the object and the image sensor 120 when the imaging operation is performed until the imaging count set in advance is reached. For example, when the step angle is 45°, and the imaging count is 5 (see FIG. 9), the rotation angle range is 180°.

When the direction of the image sensor 120 is designated by the user each time the image sensor 120 and the lens array 130 are driven, the operation section 170 transmits the direction designated by the user to the rotation device 160. The operation section 170 transmits an end command when all of the directions desired by the user have been designated. Note that the step F1 and the step F2 need not be performed when the user directly (manually) adjusts the direction of the image sensor 120.

When the target direction of the image sensor 120 is programmed in advance, the operation section 170 sequentially transmits the target direction of the image sensor 120 stored in a memory provided to the operation section 170 to the rotation device 160. The operation section 170 transmits an end command when the directions stored in the memory have been transmitted.

When the rotation angle range and the imaging count are designated, the operation section 170 calculates the target directions of the image sensor 120 in the same number as the designated imaging count so that the image sensor 120 and the like are rotated (driven) within the designated rotation angle range at equal angular intervals. In this case, the first direction is set to 0°. The operation section 170 sequentially transmits the calculated directions to the rotation device 160. For example, when the rotation angle range is 180°, and the imaging count is 5 (see FIG. 9), the operation section 170 transmits information that represents the directions {0°, 45°, 90°, 135°, 180°}. The operation section 170 transmits an end command when the calculated directions have been transmitted.

When the rotation angle range and the step angle are designated, the operation section 170 calculates the directions of the image sensor 120 so that the image sensor 120 and the like are rotated (driven) within the designated rotation angle range by the designated step angle, and sequentially transmits the calculated directions to the rotation device 160. Note that the maximum value of the direction of the image sensor 120 is set to be equal to the rotation angle range. For example, when the rotation angle range is 180°, and the step angle is 50°, the operation section 170 transmits the directions {0°, 50°, 100°, 150°, 180°}. Specifically, since the rotation angle range is 180°, the step angle is set to 30° during the fourth rotation. The operation section 170 transmits an end command when the calculated directions have been transmitted.

When the step angle and the imaging count are designated, the operation section 170 sets the first direction to 0°, calculates the directions of the image sensor 120 in the same number as the designated imaging count, and sequentially transmits the calculated directions to the rotation device 160. For example, when the step angle is 30°, and the imaging count is 4, the operation section 170 transmits the directions {0°, 30°, 60°, 90°} so that the image sensor 120 and the like are rotated (driven) three times by 30°. The operation section 170 transmits an end command when the calculated directions have been transmitted.

As described above, the rotation device 160 may rotate the image of the object and the image sensor 120 relative to each other based on at least two pieces of information among the imaging count i (where i is an integer equal to or larger than 2) of the object, the step angle that is the relative rotation angle of the image of the object and the image sensor 120 until a (j+1)th (where j is an integer equal to or larger than 1) imaging operation is performed after a jth imaging operation has been performed, and the relative rotation angle range of the image of the object and the image sensor 120 while the imaging operation is performed i times.

This makes it possible to rotate the image of the object and the image sensor 120 relative to each other in a flexible way corresponding to the imaging conditions without requiring the user to manually rotate the image sensor 120 and the like each time the imaging operation is performed, or programming the direction of the image sensor 120 in advance, for example.

The rotation device 160 rotates (drives) the image sensor 120 and the lens array 130 so that the direction designated by the operation section 170 is achieved (F2). When rotating the image sensor 120 and the lens array 130, the rotation angle may be detected by measuring the number of pulses of a stepping motor, or utilizing an angle sensor or a rotary encoder.

The angle acquisition section 141 acquires the direction of the image sensor 120 after completion of the adjustment of the direction of the image sensor 120 and the like (F3). The direction of the image sensor 120 may be acquired using a method that causes the angle acquisition section 141 to measure the angle, a method that acquires the value used when the rotation device 160 performs positioning, a method that acquires the value designated by the operation section 170, or the like.

The image acquisition section 143 acquires the cell information (pixel coordinate values and image information) about the image sensor 120 after completion of the adjustment of the direction of the image sensor 120 and the like (F4). Note that the step F3 and the step F4 may be performed in an arbitrary order, or may be performed at the same time.

The storage section 150 stores the direction (rotation information) of the image sensor 120 acquired by the angle acquisition section 141, and the cell information acquired by the image acquisition section 143 in a linked manner (i.e., as one set of information) (F5).

It is possible to generate a disparity image from which the disparity can be detected by comparing the rotation information linked to the image information with the disparity image generated before rotation based on the image information when the storage section 150 stores the rotation information and the image information in a linked manner, for example.

The steps F1 to F5 are repeated until a termination condition is satisfied (F6). Examples of the termination condition include a termination trigger issued by the operation section 170, a time-out, and the like.

The flow of the process that generates the disparity image that can be compared with the disparity image generated before rotation is described in detail below with reference to the flowchart illustrated in FIG. 10.

The disparity images from which the disparity can be detected are images characterized in that the difference between the images is due to only the difference in viewpoint, and does not include a difference due to an additional factor. Examples of the difference due to an additional factor include a difference due to the state of the optical system during imaging, a difference due to image processing, and the like. In the first embodiment, since the imaging operation is performed while rotating the image sensor 120 and the lens array 130 relative to the imaging lens 110 (see above), a plurality of images obtained after completion of the process illustrated in FIG. 8 (flowchart) include a difference due to an additional factor other than the difference in viewpoint.

In order to detect the disparity from two images by comparing the two images, the following three conditions must be satisfied. The first condition is a condition whereby the two images include pixels that belong to (are disposed in) the same pixel coordinate system, and the second condition is a condition whereby the two images were captured in a state in which the position of each microlens of the microlens array is identical. The third condition is a condition whereby the two images were captured in a state in which the positions of a plurality of photodetector cells that correspond to the light-receiving area of each microlens are identical. A plurality of images obtained after completion of the process illustrated in FIG. 8 (flowchart) do not satisfy the above conditions. In the first embodiment, the images are corrected by image processing as if the images were captured in a state in which the above conditions are satisfied. Specifically, the process described below is performed.

Figure 10:
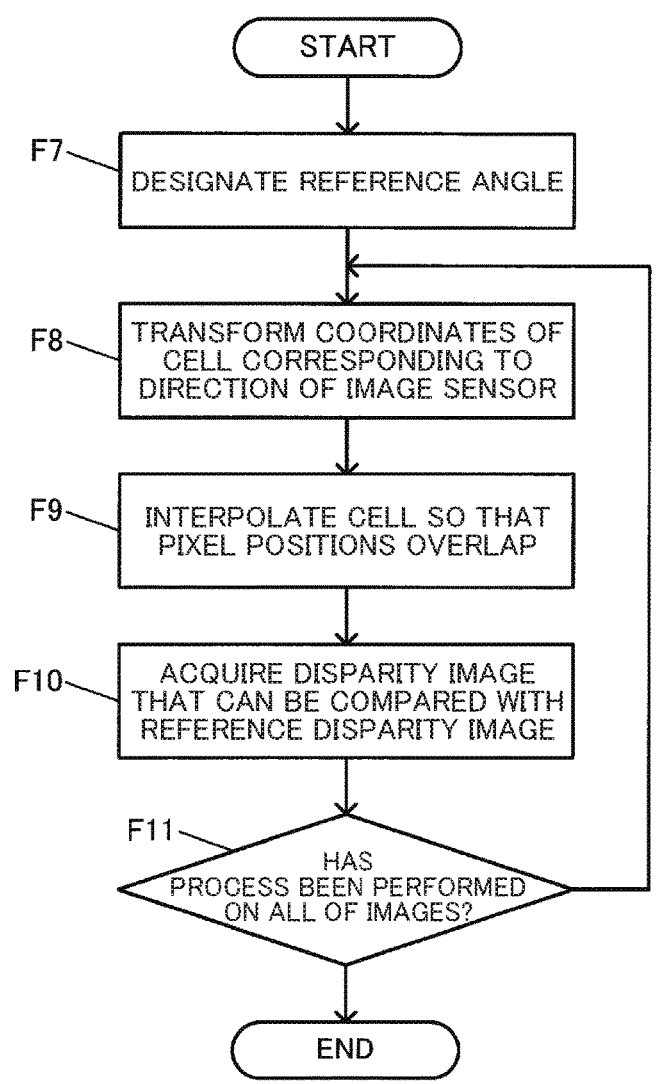
FIG. 10 is a flowchart illustrating the flow of a process (first embodiment).

The cell information acquired by the image sensor 120 set to each direction designated by the operation section 170, and the direction (rotation information) of the image sensor 120 when the image sensor 120 acquired the cell information have been stored in the storage section 150 before the process illustrated in FIG. 10 (flowchart) is performed.

Figure 11:
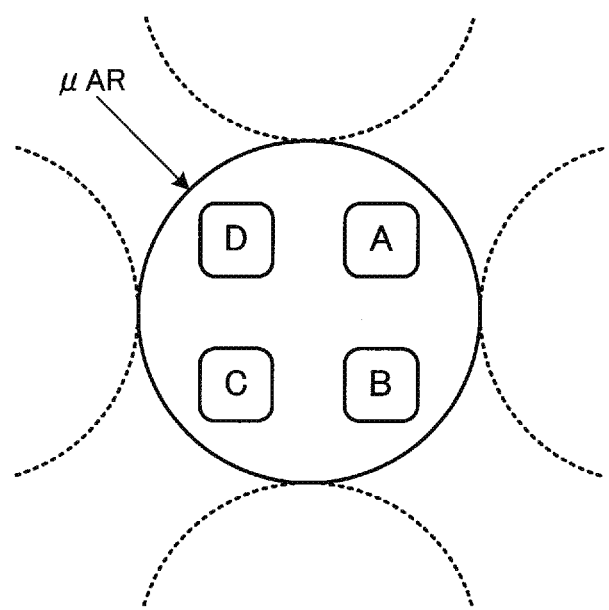
FIG. 11 is a view illustrating a light-receiving area of a microlens.

For example, the image sensor 120 has the configuration illustrated in FIG. 11 in which four photodetector cells (A, B, C, and D) are disposed within the light-receiving area μAR of each microlens. When the image sensor 120 illustrated in FIG. 11 is used, four disparity images can be obtained without rotating the image sensor 120.

The processing section 140 sets the reference angle (F7). The term "reference angle" used herein refers to the angle of the image sensor 120 that is used as a reference for adjusting the direction of the rotated image. The user designates the reference angle using the operation section 170, for example. When the reference angle is not designated by the user, the reference angle is set to a default value. The default value of the reference angle may be set arbitrarily (e.g., the direction of the image sensor 120 may be set to 0° (see FIG. 9)).

The image synthesis section 145 performs a coordinate transformation process on the acquired image based on the cell information stored in the storage section 150 so that the direction of the acquired image coincides with the direction of the image that corresponds to the reference angle (F8). In other words, the processing section 140 acquires the image information that corresponds to a first pixel coordinate system after rotating the image of the object and the image sensor 120 relative to each other, and performs the coordinate transformation process that transforms the pixel coordinate system of the image information from the first pixel coordinate system to a second pixel coordinate system based on the rotation information.

Figure 12A:
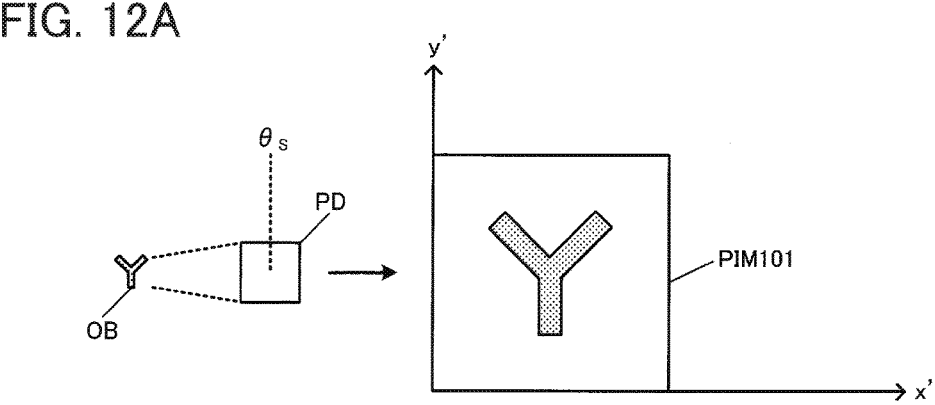
FIGS. 12A to 12C are views illustrating a coordinate transformation process.
Figure 12B:
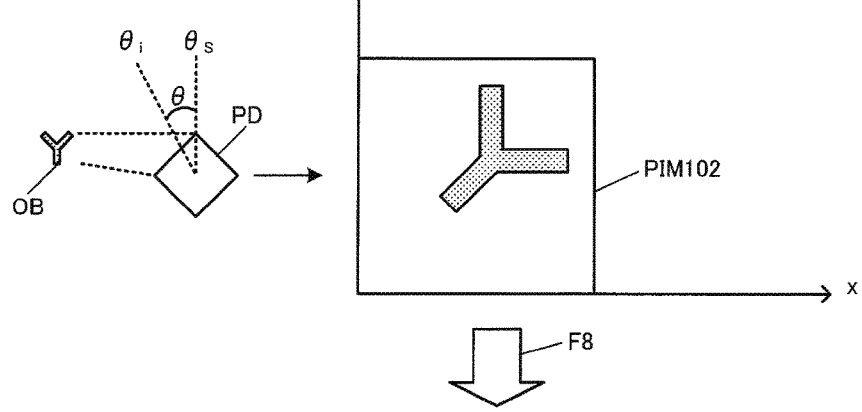
Figure 12C:
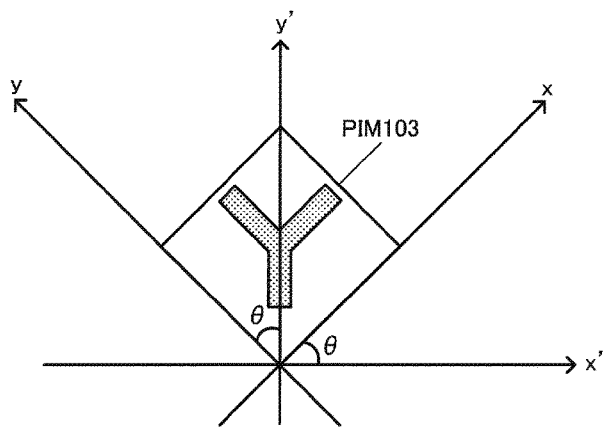

FIGS. 12A to 12C illustrate a specific example of the coordinate transformation process. FIG. 12A illustrates an image PIM101 obtained by capturing the object OB in a state in which the image sensor PD is set to a reference angle $\theta_s$. In the example illustrated in FIGS. 12A to 12C, the pixel coordinate system that defines the horizontal axis x' and the vertical axis y' of the image PIM101 corresponds to the second pixel coordinate system (see above).

FIG. 12B illustrates an image PIM102 obtained by capturing the object OB in a state in which the image sensor PD is set to an arbitrary rotation angle $\theta_i$. In the example illustrated in FIGS. 12A to 12C, the pixel coordinate system that defines the horizontal axis x and the vertical axis y of the image PIM102 corresponds to the first pixel coordinate system (see above).

In this case, the relative rotation angle θ of the image of the object and the image sensor 120 is calculated by the following expression (1). The rotation angle θ has been stored in the storage section 150 while being lined to the image PIM102 (see above).

$$\theta = \theta_s - \theta_i \quad (1)$$

In the step F8, the coordinate transformation process that transforms the pixel coordinate system of the image PIM102 from the first pixel coordinate system to the second pixel coordinate system is performed based on the rotation angle θ using the following expression (2) to acquire an image PIM103 (see FIG. 12C). The image PIM103 is an image captured in a state in which the image sensor PD is set to an arbitrary rotation angle $\theta_i$, but belongs to the first pixel coordinate system to which the image PIM101 belongs.

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix} \quad (2)$$

This makes it possible to acquire images in which the image of the object is captured in the same direction, for example.

The three conditions that must be satisfied in order to detect the disparity have been described above. The first condition has been satisfied as a result of performing the step F8. However, the second condition and the third condition have not been satisfied. In order to detect the disparity from the image obtained by the step F8 and an image used as a reference (hereinafter referred to as "reference image") through the comparison process, the position of each microlens of the microlens array must be identical between the image obtained by the step F8 and the reference image, and the positions of a plurality of photodetector cells that correspond to the light-receiving area of each microlens must be identical between the image obtained by the step F8 and the reference image.

The reasons therefor are described below. Light rays that are received by the photodetector cells included in the light-receiving area of the microlens are light rays emitted from one point of the object plane of the imaging lens, and have information that generates a pixel at the corresponding (identical) pixel position in a plurality of disparity images. The photodetector cells included in the light-receiving area that receive such light rays are determined by the area of the imaging lens pupil plane through which the light rays have passed, and the disparity is observed between the generated disparity images.

The disparity is a difference due to the viewpoint with respect to the image information obtained from light rays that have passed through an identical point of the object plane of the imaging lens. Therefore, a difference other than the disparity is also observed between pieces of image information obtained from light rays that have passed through different points of the object plane of the imaging lens. Specifically, it is necessary to compare pieces of image information obtained from light rays that have passed through an identical point of the object plane of the imaging lens in order to detect only the disparity.

Figure 13A:
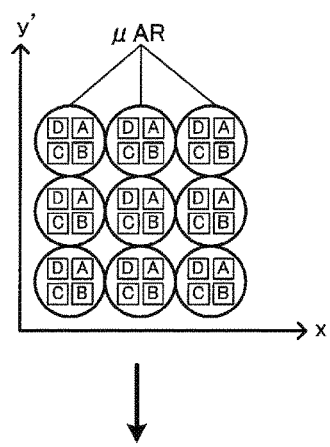
FIGS. 13A to 13E are views illustrating an interpolation process.
Figure 13B:
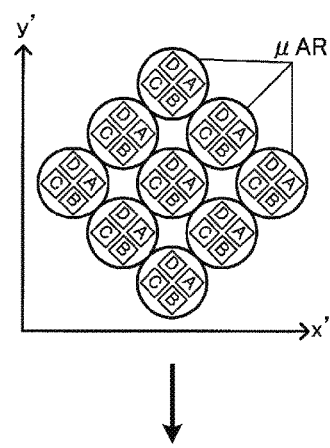
Figure 13C:
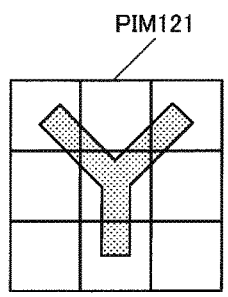
Figure 13D:
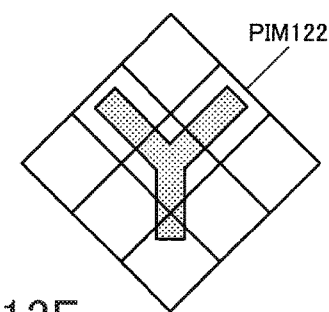

However, when the image sensor and the microlens array are rotated relative to the imaging lens, the photodetector cells included in the light-receiving area of an identical microlens receive light rays that have passed through different points of the object plane of the imaging lens due to rotation. This is because the position of the light-receiving area of the microlens is shifted due to the rotation of the image sensor and the microlens array. For example, the light-receiving areas μAR of the microlenses arranged (in the x' y' pixel coordinate system) as illustrated in FIG. 13A are arranged as illustrated in FIG. 13B (i.e., the light-receiving areas are shifted) due to rotation (FIG. 14A (described later) illustrates a similar state). Therefore, the photodetector cell may receive a light ray that has passed through a point A of the object plane of the imaging lens before rotation, and receive a light ray that has passed through a point B of the object plane of the imaging lens after rotation, for example. In such a case, when an image PIM121 illustrated in FIG. 13C is generated from the cell information illustrated in FIG. 13A, and an image PIM122 illustrated in FIG. 13D is generated from the cell information illustrated in FIG. 13B, it is impossible to accurately detect the disparity between the image PIM121 and the image PIM122 by comparing the image PIM121 and the image PIM122.

Figure 13E:
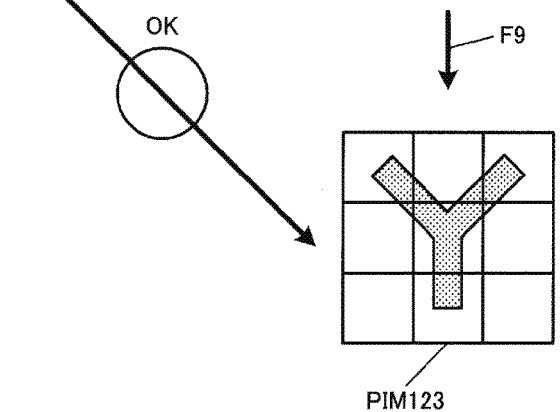

In the step F9, an interpolation process is performed on the cell information (image PIM122) obtained by the coordinate transformation process so that the image PIM122 overlaps the reference image PIM121 to generate an interpolated image PIM123 (see FIG. 13E). Specifically, the processing section 140 performs the interpolation process based on the image information obtained by the coordinate transformation process to generate interpolated image information, and generates a disparity image based on the interpolated image information (F9). Therefore, it is possible to compare the interpolated image PIM123 with the reference image PIM121 to detect the disparity.

Figure 14A:
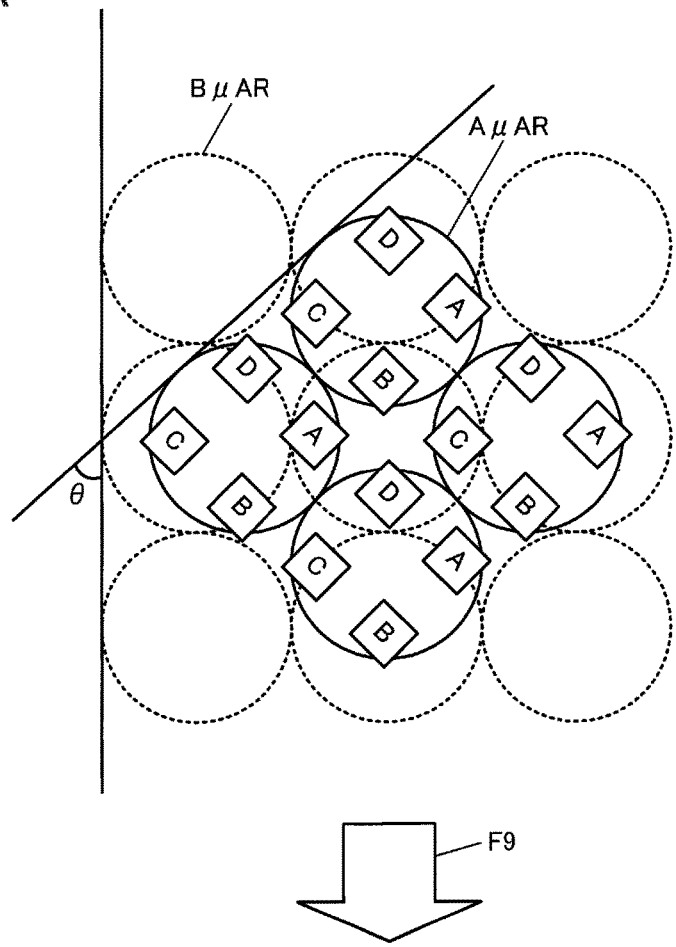
FIGS. 14A and 14B are views illustrating a shift in light-receiving area.
Figure 14B:
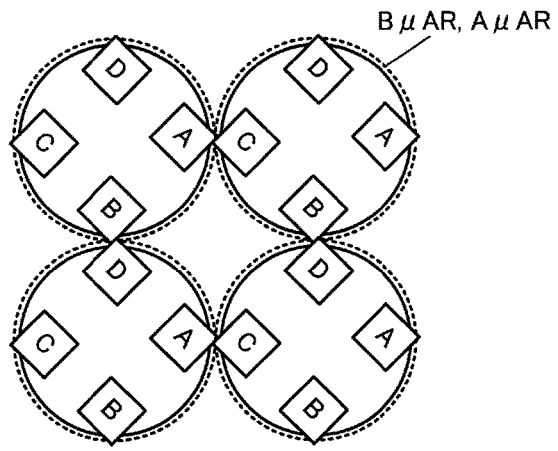

The process illustrated in FIGS. 14A and 14B is performed in the step F9. In the example illustrated in FIGS. 14A and 14B, BμAR is the pixel area that corresponds to the light-receiving area before the image sensor is rotated relative to the image of the object by θ°, and AμAR is the pixel area that corresponds to the light-receiving area after the image sensor has been rotated relative to the image of the object by θ°. In this case, the pixel area that corresponds to the light-receiving area before the image sensor is rotated relative to the image of the object by θ° and the pixel area that corresponds to the light-receiving area after the image sensor has been rotated relative to the image of the object by θ° do not overlap each other before the step F9 is performed (see FIG. 14A), and overlap each other after the step F9 has been performed (see FIG. 14B).

Figure 15:
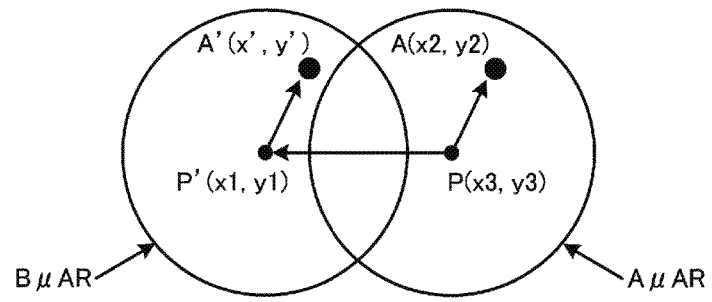
FIG. 15 is a view illustrating a method for determining interpolation target pixel coordinates.

The step F9 is described in detail below with reference to FIG. 15. In the example illustrated in FIG. 15, a pixel A that corresponds to a pixel A after the coordinate transformation process is interpolated in an area that corresponds to the light-receiving area of the microlens used as a reference (e.g., the light-receiving area of the microlens before the coordinate transformation process is performed).

Specifically, the coordinates of the pixel A' are calculated. The center coordinates of the light-receiving area of the microlens within the reference image are referred to as P'($x_1$, $y_1$), the coordinates of the pixel A are referred to as A($x_2$, $y_2$), and the center coordinates of the light-receiving area of the microlens after the coordinate transformation process that includes the pixel A are referred to as P($x_3$, $y_3$). The coordinates of the pixel A, the center point (pixel) P, and the center point (pixel) P' are known. In this case, since pixels having identical LF information have an identical positional relationship with one point (e.g., center point) within the light-receiving area of the microlens, the coordinates (x', y') of the pixel A' can be calculated using the following expression (3).

$$(x', y') = (x_1 + x_2 - x_3, y_1 + y_2 - y_3) \quad (3)$$

The pixel value of the pixel A' is then calculated. The pixel value of the pixel A' is calculated using the pixel values of a plurality of pixels that are situated in the vicinity of the pixel A' and have identical LF information. The pixel value may be interpolated using a nearest neighbor method, a bilinear method, a bicubic method, or the like. An example in which the pixel value is interpolated using a bilinear method is described below with reference to FIG. 16.

Figure 16:
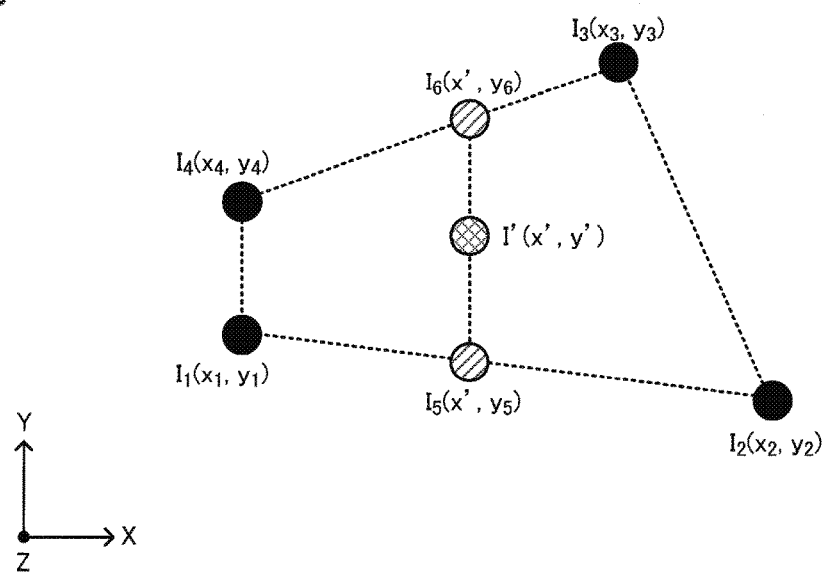
FIG. 16 is a view illustrating a method for determining an interpolation target pixel value using a bilinear method.

The point I'(x', y') illustrated in FIG. 16 represents that a pixel having a pixel value I' is situated at the coordinates (x', y'). In this example, the pixel value I' at the coordinates (x', y') is calculated from four pixels $I_1(x_1, y_1)$, $I_2(x_2, y_2)$, $I_3(x_3, y_3)$, and $I_4(x_4, y_4)$ of which the coordinates and the pixel value are known. Note that the coordinates (x', y') are calculated using the expression (3).

The pixel values and the y-axis coordinate values of a pixel $I_5(x', y_5)$ which is situated on a line segment that connects the pixel $I_1(x_1, y_1)$ and the pixel $I_2(x_2, y_2)$ and of which the x-axis coordinate value is x', and a pixel $I_6(x', y_6)$ which is situated on a line segment that connects the pixel $I_3(x_3, y_3)$ and the pixel $I_4(x_4, y_4)$ and of which the x-axis coordinate value is x', are calculated. The pixel value $I_5$ of the pixel $I_5(x', y_5)$ can be calculated by the following expression (4) using the ratio of the x-axis coordinate values, and the y-axis coordinate value $y_5$ of the pixel $I_5(x', y_5)$ can be calculated by the following expression (5).

$$I_5 = \left| \frac{x_1 - x'}{x_1 - x_2} \right| \times I_2 + \left| \frac{x_2 - x'}{x_1 - x_2} \right| \times I_1 \quad (4)$$

$$y_5 = \left| \frac{x_1 - x'}{x_1 - x_2} \right| \times y_2 + \left| \frac{x_2 - x'}{x_1 - x_2} \right| \times y_1 \quad (5)$$

Likewise, the pixel value $I_6$ of the pixel $I_6(x', y_6)$ can be calculated by the following expression (6), and the y-axis coordinate value $y_6$ of the pixel $I_6(x', y_6)$ can be calculated by the following expression (7).

$$I_6 = \left| \frac{x_3 - x'}{x_3 - x_4} \right| \times I_4 + \left| \frac{x_4 - x'}{x_3 - x_4} \right| \times I_3 \quad (6)$$

$$y_6 = \left| \frac{x_3 - x'}{x_3 - x_4} \right| \times y_4 + \left| \frac{x_4 - x'}{x_3 - x_4} \right| \times y_3 \quad (7)$$

Since the pixel I'(x', y') is situated on a line segment that connects the pixel $I_5(x', y_5)$ and the pixel $I_6(x', y_6)$, the pixel value I' of the pixel I'(x', y') can be calculated by the following expression (8) using the ratio of the y-coordinate values.

$$I' = \left| \frac{y_5 - y'}{y_5 - y_6} \right| \times I_6 + \left| \frac{y_6 - y'}{y_5 - y_6} \right| \times I_5 \quad (8)$$

This makes it possible to generate a disparity image as if the disparity image were captured in a state in which the position of each microlens of the microlens array is identical to the reference position of each microlens, and the positions of a plurality of photodetector cells that correspond to the light-receiving area of each microlens are identical to the reference position of each photodetector cell, for example.

Specifically, it is possible to acquire a disparity image from which the disparity can be detected through comparison with the reference image (F10). The steps F8 to F10 are performed on all of the images stored in the storage section 150 (F11). The process according to the first embodiment is thus completed.

As described above, the processing section 140 rotates the image of the object and the image sensor 120 relative to each other (F2), acquires the image information that corresponds to the first pixel coordinate system (F4), performs the coordinate transformation process that transforms the pixel coordinate system of the image information from the first pixel coordinate system to the second pixel coordinate system based on the rotation information (F8), performs the interpolation process based on the image information obtained by the coordinate transformation process (F9) to generate interpolated image information, and generates a disparity image based on the interpolated image information (F10).

According to the first embodiment, light rays that pass through the imaging lens pupil plane and are focused on the imaging lens image plane are separated by the effect of the microlens corresponding to the passage area of the pupil plane.

The position at which a light ray passes through the pupil plane and the position at which the light ray is received by the light-receiving area of the microlens are point-symmetrical with respect to the center of the pupil plane and the light-receiving area of the microlens.

Therefore, since light rays that have passed through the pupil plane at an identical position enter the photodetector cells situated at an identical position within the light-receiving area of each microlens, disparity images that differ in viewpoint can be obtained by generating an image using only the pixels calculated from the cell information at an identical position within the light-receiving area of each microlens.

Figure 17:
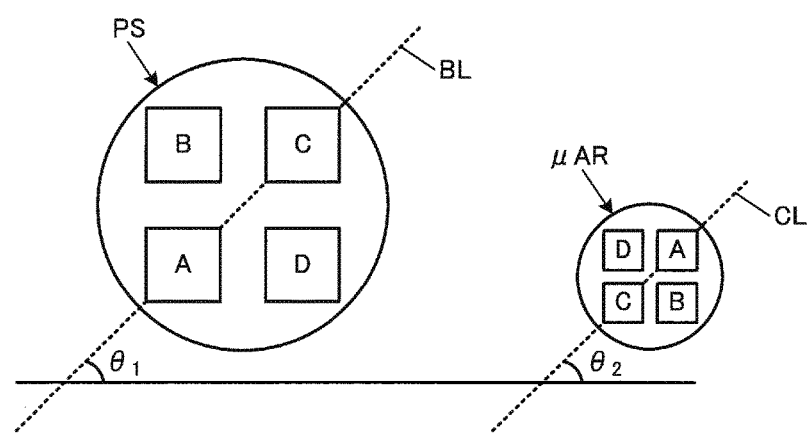
FIG. 17 is a view illustrating processing results (first embodiment).
Figure 18:
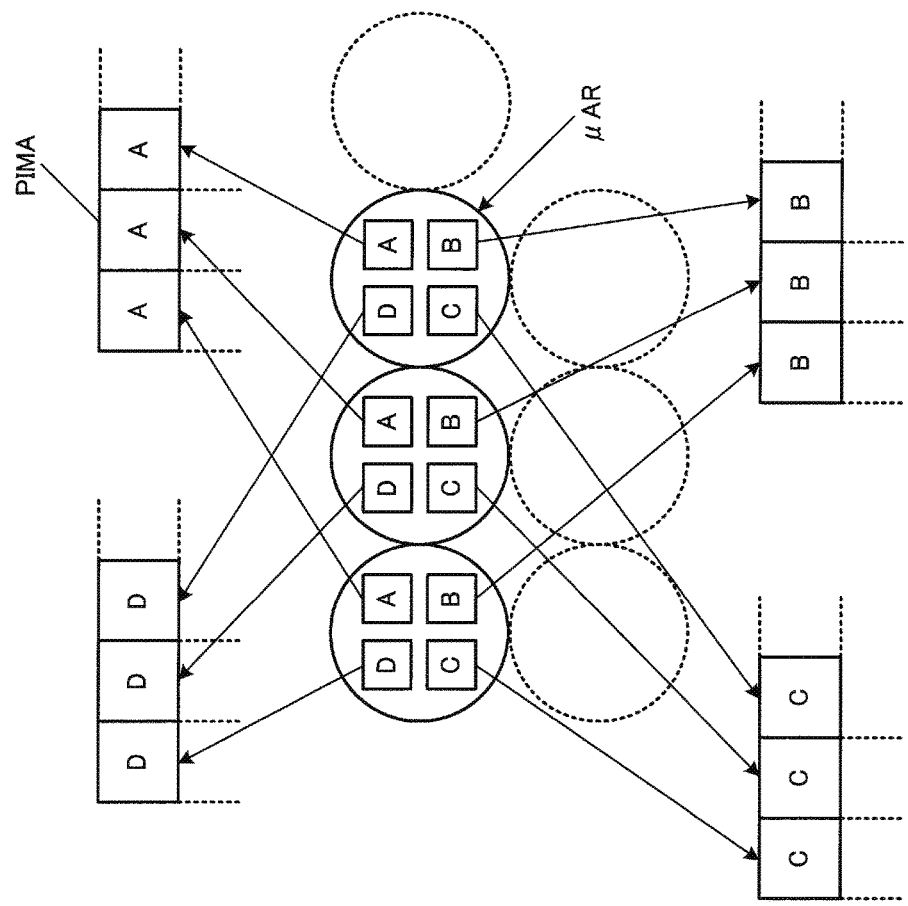
FIG. 18 is a view illustrating disparity images (first embodiment).

For example, a light ray that has passed through the lower left light ray passage area A of the imaging lens pupil plane PS illustrated in FIG. 17 enters the upper right photodetector cell A within the light-receiving area μAR of the microlens. Therefore, the disparity image PIMA illustrated in FIG. 18 that is generated using only the pixels calculated from the cell information obtained from the photodetector cell A within the light-receiving area μAR of each microlens is an image of which the viewpoint is the lower left light ray passage area A of the imaging lens pupil plane PS.

Since the viewpoints in the imaging lens pupil plane PS and the photodetector cells within the light-receiving area μAR of the microlens are point-symmetrical with respect to the center, the direction $\theta_1$ of a base line BL formed by the viewpoints and the angle $\theta_2$ of a straight line CL that connects the photodetector cells are equal to each other (see FIG. 17).

Figure 19:
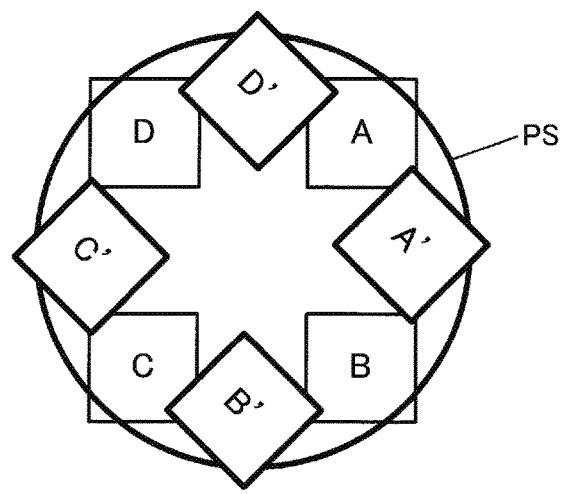
FIG. 19 is a view illustrating a viewpoint.
Figure 20:
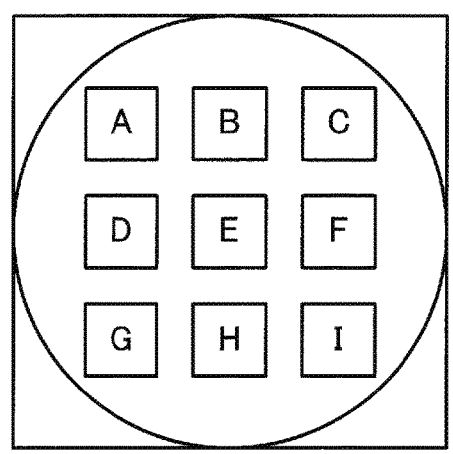
FIG. 20 is a view illustrating an image sensor that includes 3×3 photodetector cells.

According to the first embodiment, it is possible to obtain eight viewpoints (A to D and A' to D') in the imaging lens pupil plane PS (see FIG. 19), and generate eight disparity images by rotating the image sensor 120 in which four photodetector cells are disposed corresponding to one microlens by 45°, for example. The number of base line directions obtained from these disparity images corresponds to that of a plenoptic 1.0 optical system in which 3×3 photodetector cells are arranged corresponding to one microlens (see FIG. 20).

When nine photodetector cells (A to I) are disposed corresponding to one microlens (see FIG. 20), the spatial resolution of the resulting image is ⅓rd of that of an image obtained using a conventional camera. According to the first embodiment, since it suffices to provide four photodetector cells corresponding to one microlens, the spatial resolution of the resulting image is half of that of an image obtained using a conventional camera. Specifically, it is possible to increase the spatial resolution by a factor of 1.5 as compared with a plenoptic 1.0 system.

It is desirable that the relative rotation angle range of the image sensor 120 with respect to the image of the object be equal to or less than 90°. Specifically, when the image sensor 120 is rotated by 90°, the arrangement of the photodetector cells overlaps the arrangement of the photodetector cells before the image sensor 120 is rotated. That is, information obtained by rotating the image sensor 120 by 90° or more can also be obtained by rotating the image sensor 120 by 90° or less. It is possible to prevent a situation in which the amount of calculations and the processing time increase due to the acquisition of overlapping images by setting the rotation range to be equal to or less than 90°.

It is desirable that the rotation angle (step angle) by which the image sensor 120 is rotated by one rotation be a value obtained by dividing 90° by an integer. Specifically, the amount of information used when interpolating a pixel varies if the step angle varies. The amount of information used when interpolating a pixel can be made uniform by setting the step angle to a value obtained by dividing 90° by an integer.

In the first embodiment, the image synthesis section 145 may generate the display image.

2.3. First Modification

A first modification of the first embodiment is described below.

The processing section 140 may generate the display image by performing an interpolation process based on first image information obtained from the image sensor 120 before rotating the image of the object and the image sensor 120 relative to each other, and second image information obtained from the image sensor 120 after rotating the image of the object and the image sensor 120 relative to each other.

The first modification generates a display image having high spatial resolution. An example in which one super-resolution image is generated as the display image is described below. Note that both the display image and the disparity image may be generated. A system configuration example according to the first modification is the same as described above with reference to FIG. 7.

It is desirable that the resolution of the display image displayed on the screen be as high as possible. However, when generating a plurality of disparity images, the spatial resolution of the image decreases as compared with that of an image obtained using a conventional camera. For example, when using an image sensor in which four photodetector cells are disposed corresponding to one microlens (see FIG. 11), the spatial resolution of the resulting image is half of that of an image obtained using a conventional camera.

Technology that estimates or interpolates a pixel (between pixels) using a plurality of images is known as a method for increasing the spatial resolution. However, when the viewpoint differs between a plurality of images (e.g., disparity images), a complex process is required to estimate or interpolate a pixel since the relative position of the viewpoint and the object differs.

In the first modification, the process is performed using a light ray that corresponds to the entire light-receiving area of one microlens instead of a light ray that is received by each photodetector cell in order to simplify the process. For example, a light ray that corresponds to the entire light-receiving area of one microlens includes a light ray that is received by the photodetector cell A, a light ray that is received by the photodetector cell B, a light ray that is received by the photodetector cell C, and a light ray that is received by the photodetector cell D (see FIG. 11). When the process is performed using a light ray that corresponds to the entire light-receiving area of one microlens, the viewpoint is fixed at the center of the imaging lens, and does not change even when the pixel coordinates are transformed by rotation. Therefore, a pixel that corresponds to a light ray that corresponds to the entire light-receiving area of each microlens (hereinafter referred to as "representative pixel") is calculated by interpolation, and a pixel of the reference image situated between the representative pixels is interpolated using the representative pixels obtained by rotating the image sensor and the like.

Figure 21:
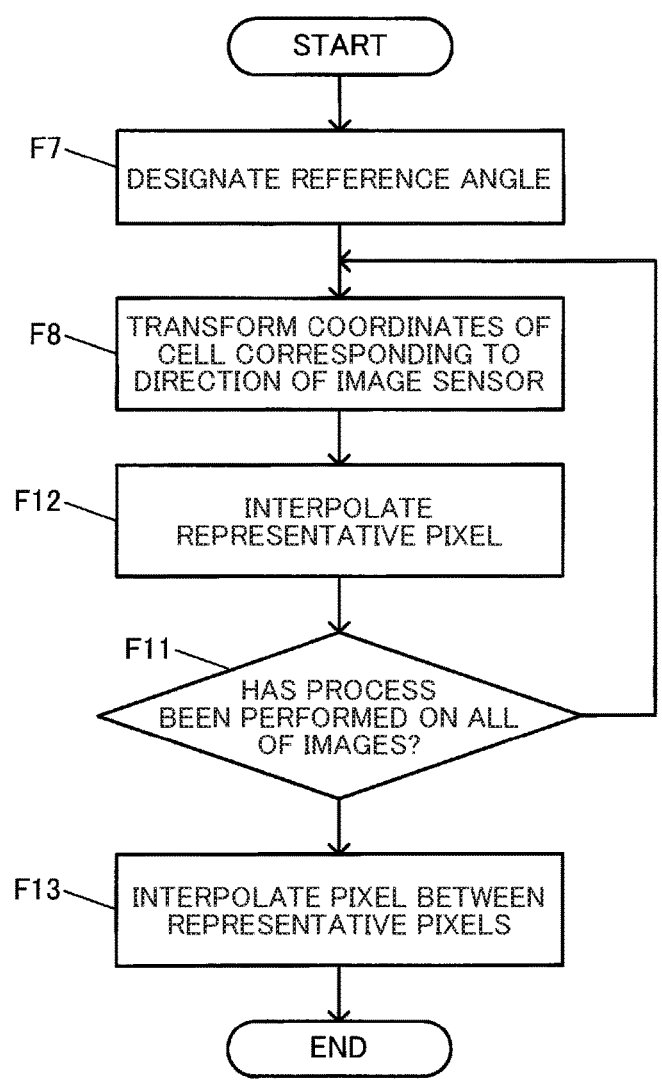
FIG. 21 is a flowchart illustrating the flow of a process (first modification).

The process according to the first modification is described below with reference to the flowchart illustrated in FIG. 21. The steps F1 to F8 are performed in the same manner as described above using the flowcharts illustrated in FIGS. 8 and 10.

Figure 22:
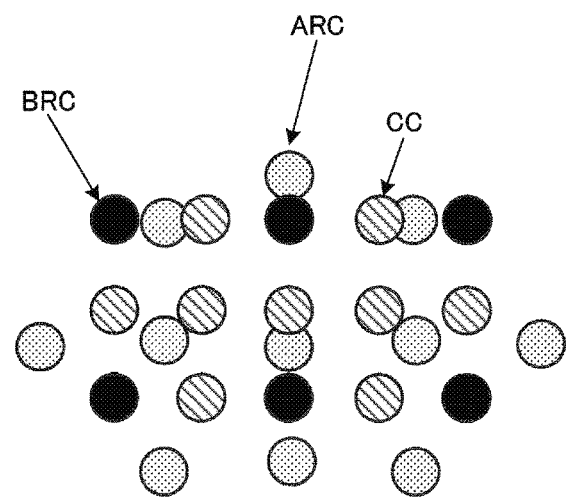
FIG. 22 is a view illustrating an interpolation process (first modification).

The representative pixel is calculated by interpolation from the cell information obtained by the coordinate transformation process performed in the step F8 corresponding to the light-receiving area of each microlens (F12). For example, the cell information about the representative pixel is calculated by averaging the cell information (pixel coordinates and pixel value) obtained from the photodetector cells included in the light-receiving area of each microlens. FIG. 22 illustrates an example in which a pixel BRC has been calculated to be the representative pixel.

The steps F8 and F12 are performed on all of the images acquired by the process illustrated in FIG. 8 (flowchart) (F11).

A pixel situated between the representative pixels is then interpolated (F13). In the first modification, the cell information about the representative pixel before rotating the image sensor and the like is used as reference cell information. The cell information after rotating the image sensor and the like is used to interpolate the reference cell information. In the example illustrated in FIG. 22, a pixel ARC has been calculated to be the pixel after rotation. In the step F13, a pixel CC between the representative pixels BRC is interpolated based on the cell information about the pixel ARC. For example, the pixel CC is a pixel that is situated at the intermediate pixel coordinates with respect to the representative pixels BRC. The interpolation process is performed in the same manner as described above in connection with the step F9.

This makes it possible to increase the spatial resolution of the display image that does not have the LF information, for example.

2.4. Second Modification

A second modification of the first embodiment is described below. In the second modification, a cylindrical lens is used as each lens of the lens array 130 instead of a microlens.

A cylindrical lens has an axis that has a curvature, and an axis that does not have a curvature. Light rays are separated with respect to the axis that has a curvature, and the LF information is acquired. On the other hand, light rays are not separated with respect to the axis that does not have a curvature, and the LF information is not acquired. However, the spatial resolution is not impaired in the direction of the axis that does not have a curvature, and the same spatial resolution as that obtained using a conventional camera can be acquired.

According to the second modification, it is possible to acquire the LF information in the direction of the axis that does not have a curvature, and prevent a decrease in spatial resolution in the direction of the axis that has a curvature, by rotating the image sensor 120.

Note that a grating (diffraction grating) may be used instead of the lens array 130 so that light rays that have passed through the imaging lens are refracted, and enter each photodetector cell.

2.5. Third Modification

A third modification of the first embodiment is described below. In the third modification, the processing section 140 performs a trimming process that trims away an edge area of the generated disparity images. The processing section 140 may also perform a trimming process that trims away an edge area of the display image.

Figure 23:
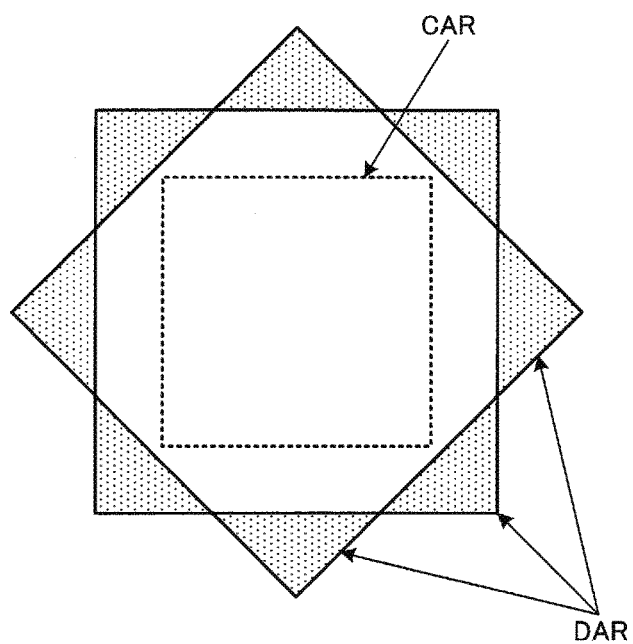
FIG. 23 is a view illustrating a trimming process.

As illustrated in FIG. 23, there may be a case where the light-receiving area of the microlens is shifted due to rotation when generating the disparity images, and an area DAR having low angular resolution in the direction of the base line is present. It is possible to eliminate an area having low angular resolution by extracting an image overlapping area CAR.

When generating the display image, the spatial resolution may not increase, and may vary depending on the area of the image when the amount of cell information used for the interpolation process is small.

It is possible to eliminate an area having low spatial resolution from the disparity image and the display image by performing the trimming process according to the third modification, for example.

3. Second Embodiment

The second embodiment is described below. In the second embodiment, the image rotation element 190 is provided between the imaging lens 110 and the lens array 130, and the image of the object is rotated relative to the image sensor 120 by rotating the image rotation element 190. Specifically, the image of the object is rotated without (instead of) rotating the image sensor 120, differing from the first embodiment.

The imaging device 100 according to the second embodiment includes the image rotation element 190 that is rotatable and is provided between the imaging lens 110 and the lens array 130. The image rotation element 190 is an image rotation prism, for example.

The processing section 140 acquires the rotation angle of the image rotation element 190 relative to the imaging lens 110 as the rotation information, and generates disparity images based on the acquired rotation angle and the image information.

Figure 25A:
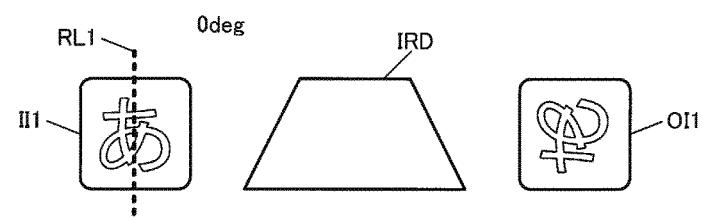
FIGS. 25A to 25C are views illustrating the rotation of an image through an image rotation prism.
Figure 25B:
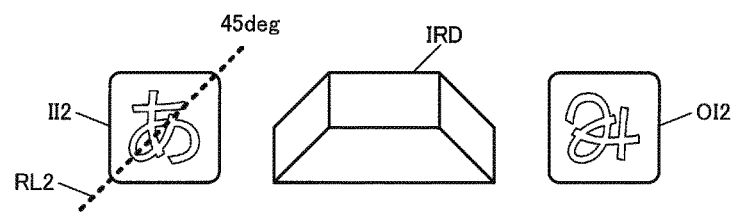
Figure 25C:
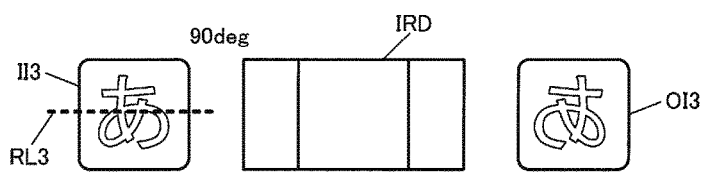

As illustrated in FIGS. 25A to 25C, an image rotation prism IRD rotates and inverts an input image, and outputs an output image. In the example illustrated in FIG. 25A, the vertical direction of the image rotation prism IRD has been adjusted as indicated by a dotted line RL1 with respect to an input image II1. In this case, the input image II1 is rotated and inverted by the image rotation prism IRD to obtain an output image OI1.

In the example illustrated in FIG. 25B, the image rotation prism IRD has been diagonally tilted by 45° with respect to an input image II2 from the state illustrated in FIG. 25A so that the vertical direction of the image rotation prism IRD is indicated by a dotted line RL2 with respect to the input image II2. In this case, the input image II2 is rotated and inverted by the image rotation prism IRD to obtain an output image OI2. In the example illustrated in FIG. 25B, the output image OI2 is rotated by 90° with respect to the output image OI1 as a result of tilting the image rotation prism IRD by 45°.

In the example illustrated in FIG. 25C, the image rotation prism IRD has been tilted by 90° with respect to an input image II3 from the state illustrated in FIG. 25A so that the vertical direction of the image rotation prism IRD is indicated by a dotted line RL3 with respect to the input image II3. In this case, the input image II3 is rotated and inverted by the image rotation prism IRD to obtain an output image OI3. In the example illustrated in FIG. 25C, the output image OI3 is rotated by 180° with respect to the output image OI1 as a result of tilting the image rotation prism IRD by 90°.

Specifically, the direction of the output image changes by an angle twice the rotation angle of the image rotation prism. It is possible to rotate the image of the object relative to the image sensor 120 by utilizing the image rotation prism, for example.

Since the image of the object can be rotated relative to the image sensor 120 without moving the image sensor 120 in which the number of lines (wires) is relatively large, it is possible to reduce the risk of failure (e.g., line (wire) breakage and contact failure), for example.

The rotation device 160 may rotate the image rotation element 190 relative to the imaging lens 110 around the optical axis (i.e., rotation axis) of the imaging lens 110.

This makes it unnecessary for the user to manually rotate the image rotation element 190, for example.

The angle acquisition section 141 acquires the angle of the image rotation element, and converts the acquired angle into a rotation angle that corresponds to the rotation angle of the image output from the image rotation element. Since the image is inverted through the image rotation prism, the image acquisition section 143 performs a coordinate transform process so that the image of the object recovers the original direction.

4. Third Embodiment

Figure 26:
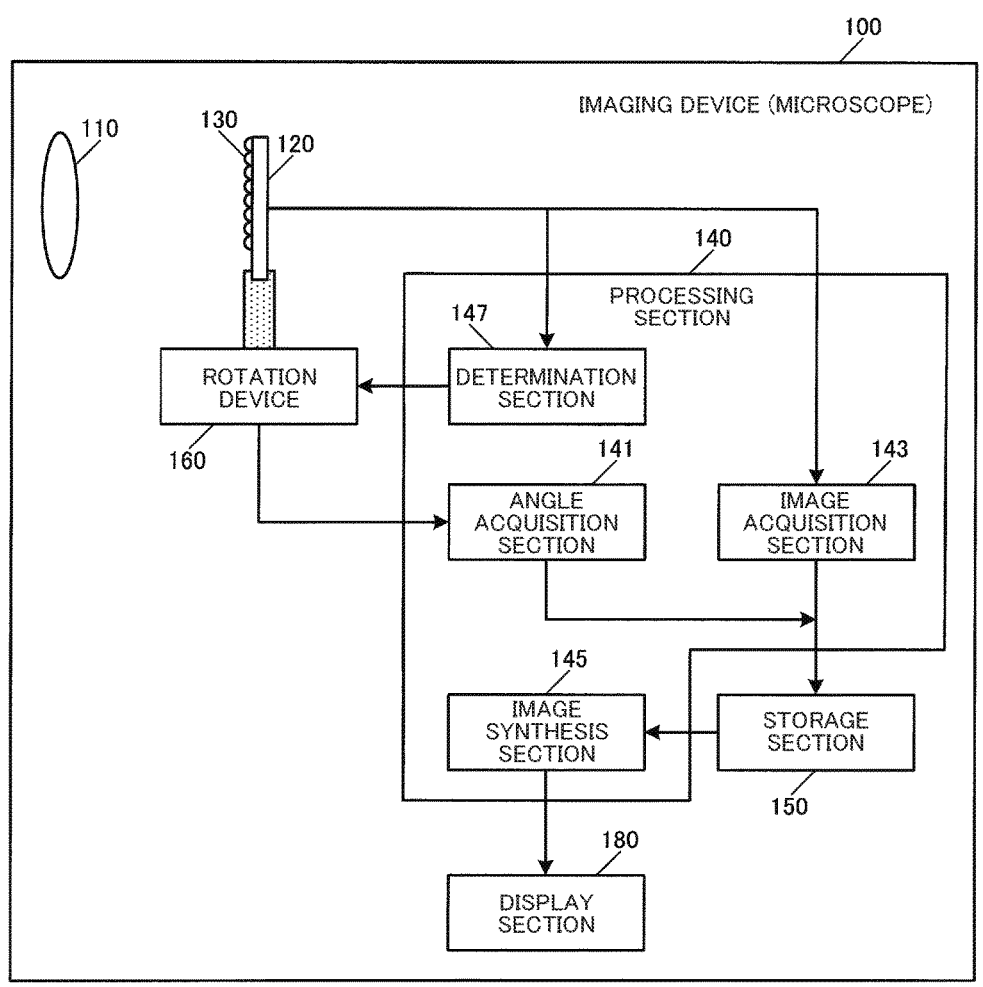
FIG. 26 illustrates a system configuration example (third embodiment).

FIG. 26 illustrates a system configuration example according to a third embodiment. In the third embodiment, the processing section 140 includes a determination section 147 in addition to the elements illustrated in FIG. 7 or 24.

The determination section 147 determines the direction of the edge of the image of the object, and calculates the relative target rotation angle of the image of the object and the image sensor 120 based on the direction of the edge of the object. The determination section 147 outputs the calculated target rotation angle to the rotation device 160.

The rotation device 160 adjusts the relative direction of the image of the object and the image sensor 120 based on the acquired target rotation angle.

Note that the rotation device 160 may rotate the image of the object and the image sensor 120 relative to each other based on the direction of the edge of the image of the object using another method.

This makes it possible to acquire necessary and sufficient cell information by adjusting the image of the object and the image sensor 120 only in the necessary direction, and prevent an increase in the amount of calculations and the processing time, for example.

5. Server

Figure 27:
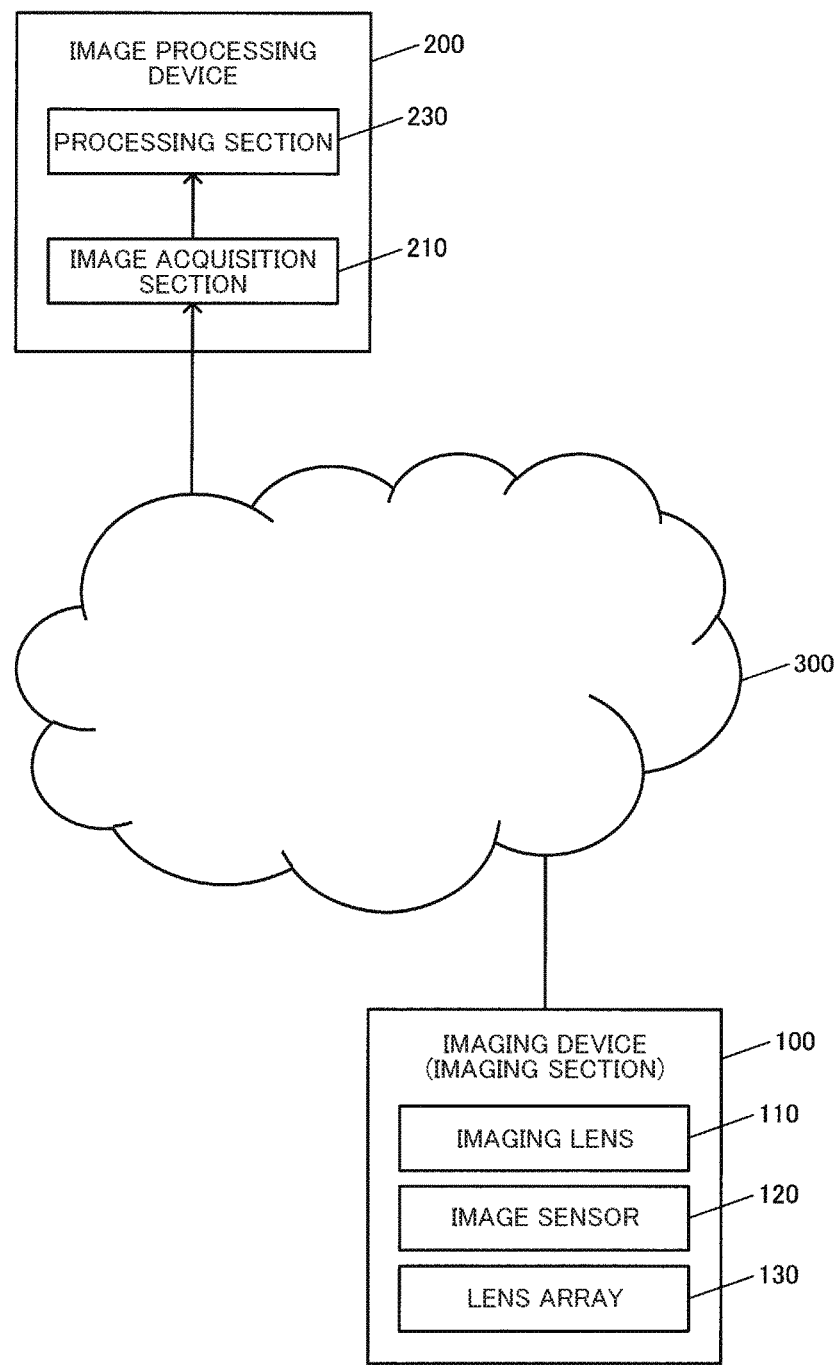
FIG. 27 illustrates a system configuration example of a server.

As illustrated in FIG. 27, the embodiments of the invention may be implemented by an image processing device 200 (server) that is connected to the imaging section 100 (imaging device) via a communication channel through a network 300 that includes at least one of a cable network and a wireless network.

In this case, the image processing device 200 includes an image information acquisition section 210 that acquires the image information obtained from the imaging section 100, and a processing section 230 that generates disparity images based on the acquired image information.

The imaging section 100 includes the imaging lens 110, the image sensor 120 that includes a photodetector cell array in which M (where M is an integer equal to or larger than 2) photodetector cells are disposed in an array, and the lens array 130 for generating disparity images that is provided between the imaging lens 110 and the image sensor 120, and includes a plurality of lenses that are disposed in an array.

The processing section 230 acquires the rotation information that represents the relative direction of the image of the object formed by the imaging lens 110 and the image sensor 120, and generates disparity images based on the acquired rotation information and the image information obtained from the image sensor 120.

6. Microscope

The imaging device according to the embodiments of the invention may be a microscope.

When the distance to the object is measured by performing triangulation using the disparity images, the distance measurement accuracy is high when the direction of the edge of the object is approximately orthogonal to the direction of the base line, and is low when the direction of the edge of the object is approximately parallel to the direction of the base line.

When an optical system (e.g., microscope) that acquires part of the object as an image is used, the number of edges may be small, and it may be impossible to acquire an edge that is orthogonal to the direction of the base line. Since the object observed using a microscope may be semi-transparent, or may have a small amount of texture (surface pattern), it is difficult to acquire a large amount of edge.

It is possible to rotate the direction of the base line, and improve the distance measurement accuracy even when it is impossible to acquire an edge that is orthogonal to the direction of the base line, or the amount of edge that can be acquired is small, by utilizing the microscope according to the embodiments of the invention.

According to the embodiments of the invention, since the cell information is acquired from the image sensor 120 by rotating the image sensor 120 or the image projected onto the image sensor 120, it may take time to completely acquire the cell information. Therefore, it is desirable that the object be stationary until the cell information is completely acquired.

Since the object that is observed using a microscope is normally stationary, it is possible to easily achieve the advantageous effects of the embodiments of the invention. Further examples of the optical system characterized in that the amount of edge of the object is small, and the motion of the object is small, include an industrial endoscope and the like.

7. Program

Part or the majority of the processes performed by the imaging device, the image processing device, the microscope, and the like according to the embodiments of the invention may be implemented by a program. In this case, the imaging device, the image processing device, the microscope, and the like according to the embodiments of the invention are implemented by causing a processor (e.g., CPU) to execute the program. Specifically, a program stored in a non-transitory information storage device is read and executed by a processor (e.g., CPU). The information storage device (computer-readable device) stores a program, data, and the like. The function of the information storage device may be implemented by an optical disk (e.g., DVD or CD), a hard disk drive (HDD), a memory (e.g., memory card or ROM), or the like. The processor (e.g., CPU) performs various processes according to the embodiments of the invention based on the program (data) stored in the information storage device. Specifically, a program that causes a computer (i.e., a device that includes an operation section, a processing section, a storage section, and an output section) to function as each section according to the embodiments of the invention (i.e., a program that causes a computer to execute the process implemented by each section according to the embodiments of the invention) is stored in the information storage device.

The imaging device, the image processing device, the microscope, and the like according to the embodiments of the invention may include a processor and a memory. The processor may implement the function of each section by individual hardware, or may implement the function of each section by integrated hardware, for example. For example, the processor may include hardware, and the hardware may include at least one of a circuit that processes a digital signal, and a circuit that processes an analog signal. For example, the processor may include one or a plurality of circuit devices (e.g., IC) or one or a plurality of circuit elements (e.g., resistor or capacitor) that are mounted on a circuit board. The processor may be a central processing unit (CPU), for example. Note that the processor is not limited to a CPU. Various other processors such as a graphics processing unit (GPU) and a digital signal processor (DSP) may also be used. The processor may be a hardware circuit that includes an application specific integrated circuit (ASIC). The processor may include an amplifier circuit, a filter circuit, and the like that process an analog signal. The memory stores a computer-readable instruction. Each section of the imaging device, the image processing device, the microscope, and the like according to the embodiments of the invention is implemented by causing the processor to execute the instruction. The memory may be a semiconductor memory (e.g., static random access memory (SRAM) or dynamic random access memory (DRAM)), a register, a hard disk, or the like. The instruction may be an instruction included in an instruction set that is included in a program, or may be an instruction that causes a hardware circuit of the processor to operate.

Although only some embodiments of the invention have been described in detail above, those skilled in the art will readily appreciate that many modifications are possible in the embodiments without materially departing from the novel teachings and advantages of the invention. Accordingly, all such modifications are intended to be included within the scope of the invention. Any term cited with a different term having a broader meaning or the same meaning at least once in the specification and the drawings can be replaced by the different term in any place in the specification and the drawings. The configuration and the operation of the imaging device, the image processing device, the image processing method, the microscope, and the like are not limited to those described in connection with the embodiments. Various modifications and variations may be made.

What is claimed is:

1. An imaging device comprising:
   an imaging lens that forms an image of an object;
   an image sensor that includes a photodetector cell array in which a plurality of photodetector cells are disposed in an array;
   a rotation device that rotates the image of the object and the image sensor relative to each other;
   a lens array for generating disparity images, the lens array being provided between the imaging lens and the image sensor, and the lens array including a plurality of lenses that are disposed in an array; and
   a processor comprising hardware,
   wherein the processor acquires rotation information that represents a relative direction of the image of the object and the image sensor, and generates the disparity images based on the acquired rotation information and image information obtained from the image sensor.

2. The imaging device as defined in claim 1, wherein the processor generates first disparity images based on first image information obtained from the image sensor before the image of the object and the image sensor are rotated relative to each other, and generates second disparity images based on second image information obtained from the image sensor after the image of the object and the image sensor are rotated relative to each other, and the rotation information.

3. The imaging device as defined in claim 1, wherein each of the plurality of lenses of the lens array is provided corresponding to N photodetector cells among M photodetector cells of the image sensor (where N is an integer equal to or larger than 2, and M is an integer equal to or larger than N), and refracts incident light that has entered each of the plurality of lenses through the imaging lens corresponding to an incident angle with respect to each of the plurality of lenses so that the incident light enters one of the N photodetector cells.

4. The imaging device as defined in claim 1, wherein the processor acquires a rotation angle when a unit including the image sensor and the lens array, or the lens array, is rotated around an optical axis of the imaging lens relative to the imaging lens, as the rotation information, and generates the disparity images based on the acquired rotation angle and the image information.

5. The imaging device as defined in claim 1, further comprising:
   an image rotation element that is rotatable and is provided between the imaging lens and the lens array,
   wherein the processor acquires a rotation angle of the image rotation element relative to the imaging lens as the rotation information, and generates the disparity images based on the acquired rotation angle and the image information.

6. The imaging device as defined in claim 1, wherein the processor acquires the image information that corresponds to a first pixel coordinate system after the image of the object and the image sensor are rotated relative to each other, and performs a coordinate transformation process that transforms a pixel coordinate system of the image information from the first pixel coordinate system to a second pixel coordinate system based on the rotation information.

7. The imaging device as defined in claim 1, wherein the processor performs an interpolation process based on the image information obtained by the coordinate transformation process to generate interpolated image information, and generates the disparity images based on the interpolated image information.

8. The imaging device as defined in claim 1, wherein the processor acquires the image information that corresponds to a first pixel coordinate system after the image of the object and the image sensor are rotated relative to each other, performs a coordinate transformation process that transforms a pixel coordinate system of the image information from the first pixel coordinate system to a second pixel coordinate system based on the rotation information, performs an interpolation process based on the image information obtained by the coordinate transformation process to generate interpolated image information, and generates the disparity images based on the interpolated image information.

9. The imaging device as defined in claim 1, wherein the processor generates a display image by performing an interpolation process based on first image information obtained from the image sensor before the image of the object and the image sensor are rotated relative to each other, and second image information obtained from the image sensor after the image of the object and the image sensor are rotated relative to each other.

10. The imaging device as defined in claim 1, further comprising:
    a memory that stores the rotation information and the image information in a linked manner.

11. The imaging device as defined in claim 1, wherein the rotation device rotates the image of the object and the image sensor relative to each other based on at least two pieces of information among an imaging count i (where i is an integer equal to or larger than 2) of the object, a step angle that is a relative rotation angle of the image of the object and the image sensor until a (j+1)th (where j is an integer equal to or larger than 1) imaging operation is performed after a jth imaging operation has been performed, and a relative rotation angle range of the image of the object and the image sensor while an imaging operation is performed i times.

12. The imaging device as defined in claim 1, further comprising:
    an image rotation element that is rotatable and is provided between the imaging lens and the lens array,
    wherein the rotation device rotates the image rotation element relative to the imaging lens around an optical axis of the imaging lens.

13. The imaging device as defined in claim 1, wherein the rotation device rotates the image of the object and the image sensor relative to each other based on a direction of an edge of the image of the object.

14. The imaging device as defined in claim 1, wherein the processor performs a trimming process that trims away an edge area of the generated disparity images.

15. An image processing device comprising:
    a processor comprising hardware, the processor being configured to implement:
        an image information acquisition process that acquires image information obtained from an imaging section, the imaging section including: an imaging lens that forms an image of an object; an image sensor that includes a photodetector cell array in which a plurality of photodetector cells are disposed in an array; a rotation device that rotates the image of the object and the image sensor relative to each other; and a lens array for generating disparity images, the lens array being provided between the imaging lens and the image sensor, and the lens array including a plurality of lenses that are disposed in an array;

a rotation information acquisition process that acquires rotation information that represents a relative direction of the image of the object and the image sensor; and a disparity image generation process that generates the disparity images based on the acquired rotation information and image information obtained from the image sensor.

16. An image processing method that generates disparity images based on image information obtained from an imaging section, the imaging section including: an imaging lens that forms an image of an object; an image sensor that includes a photodetector cell array in which a plurality of photodetector cells are disposed in an array; a rotation device that rotates the image of the object and the image sensor relative to each other; and a lens array for generating disparity images, the lens array being provided between the imaging lens and the image sensor, the lens array including a plurality of lenses that are disposed in an array, and the image processing method comprising:

acquiring rotation information that represents a relative direction of the image of the object and the image sensor; and generating the disparity images based on the acquired rotation information and image information obtained from the image sensor.

17. A microscope comprising:

an imaging lens that forms an image of an object;

an image sensor that includes a photodetector cell array in which a plurality of photodetector cells are disposed in an array;

a rotation device that rotates the image of the object and the image sensor relative to each other;

a lens array for generating disparity images, the lens array being provided between the imaging lens and the image sensor, and the lens array including a plurality of lenses that are disposed in an array; and a processor comprising hardware, wherein the processor acquires rotation information that represents a relative direction of the image of the object and the image sensor, and generates the disparity images based on the acquired rotation information and image information obtained from the image sensor.

* * * * *